(12) United States Patent
Blust et al.

(10) Patent No.: US 8,041,454 B2
(45) Date of Patent: Oct. 18, 2011

(54) AUTOMATED BUSINESS SYSTEM AND METHOD OF VENDING AND RETURNING A CONSUMER PRODUCT

(75) Inventors: Donald Blust, Milwaukee, WI (US); Thomas Driscoll, Cedarburg, WI (US)

(73) Assignee: NCR Corporation, Duluth, GA (US)

(*) Notice: Subject to any disclaimer, the term of this patent is extended or adjusted under 35 U.S.C. 154(b) by 49 days.

(21) Appl. No.: 12/328,231

(22) Filed: Dec. 4, 2008

(65) Prior Publication Data

US 2011/0184554 A9      Jul. 28, 2011

Related U.S. Application Data

(62) Division of application No. 10/866,387, filed on Jun. 11, 2004.

(60) Provisional application No. 60/477,619, filed on Jun. 11, 2003.

(51) Int. Cl.
*G06F 17/00* (2006.01)

(52) U.S. Cl. ......... 700/244; 700/241; 700/236; 700/232

(58) Field of Classification Search ........... 700/231–244
See application file for complete search history.

(56) References Cited

U.S. PATENT DOCUMENTS

| | | | |
|---|---|---|---|
| 4,982,337 A * | 1/1991 | Burr et al. ............ 700/235 |
| 5,273,183 A | 12/1993 | Tuttobene | |
| 5,385,265 A | 1/1995 | Schlamp | |
| 5,467,892 A | 11/1995 | Schlamp | |
| 5,482,139 A | 1/1996 | Rivalto | |
| 5,499,707 A | 3/1996 | Steury | |
| 5,927,544 A | 7/1999 | Kanoh et al. | |
| 5,939,985 A | 8/1999 | Tsai et al. | |
| 5,949,688 A | 9/1999 | Montoya et al. | |
| 5,963,134 A | 10/1999 | Bowers et al. | |
| 6,003,008 A | 12/1999 | Postrel et al. | |
| 6,134,547 A | 10/2000 | Huxley et al. | |
| 6,264,104 B1 | 7/2001 | Jenkins et al. | |
| 6,283,322 B1 | 9/2001 | Liff et al. | |
| 6,327,230 B1 | 12/2001 | Miller et al. | |
| 6,330,491 B1 | 12/2001 | Lion | |
| 6,366,914 B1 | 4/2002 | Stern | |
| 6,401,074 B1 | 6/2002 | Sleeper | |
| 6,412,654 B1 | 7/2002 | Cleeve | |
| 6,416,270 B1 | 7/2002 | Steury et al. | |
| 6,430,537 B1 | 8/2002 | Tedesco et al. | |
| 6,454,163 B2 | 9/2002 | Peebles et al. | |
| 6,471,089 B2 | 10/2002 | Liff et al. | |
| 6,477,503 B1 | 11/2002 | Mankes | |
| 6,516,998 B2 | 2/2003 | Calder et al. | |
| 6,591,247 B2 | 7/2003 | Stern | |

(Continued)

OTHER PUBLICATIONS

DVDPLAY Web site pages, http://www.dvdplay.net.

(Continued)

*Primary Examiner* — Michael Collins
(74) *Attorney, Agent, or Firm* — Peter Priest; Robert S. Chee

(57) ABSTRACT

System and method of dispensing disc-based media and other consumer products. A user can interact with an automated business system to select disc-based media for rental and/or purchase. The automated business system can retrieve the selection from the interior of the automated business system and dispense the selection through a port to the user. The automated business system can retrieve the selection from the port in a return process.

20 Claims, 38 Drawing Sheets

U.S. PATENT DOCUMENTS

| | | | |
|---|---|---|---|
| 6,595,342 B1 | 7/2003 | Maritzen et al. | |
| 6,597,970 B1 | 7/2003 | Steury et al. | |
| 6,606,602 B1 | 8/2003 | Kolls | |
| 6,622,064 B2 | 9/2003 | Bartholomew et al. | |
| 6,655,580 B1 | 12/2003 | Ergo et al. | |
| 6,711,464 B1 | 3/2004 | Yap et al. | |
| 7,380,711 B2 | 6/2008 | Simon et al. | |
| 7,444,296 B1* | 10/2008 | Barber et al. | 705/17 |
| 2002/0046122 A1* | 4/2002 | Barber et al. | 705/17 |
| 2004/0015887 A1 | 1/2004 | Kudo | |
| 2004/0088063 A1 | 5/2004 | Hoshi et al. | |
| 2004/0193314 A1 | 9/2004 | Tilles et al. | |
| 2005/0177492 A1 | 8/2005 | Camping | |

OTHER PUBLICATIONS

DVDXpress Web site pages, http://www.dvdxpress.net.

V&L Tool Web site pages, http://www.interactiveds.com.

Anne Schwartz, Waukesha company making DVD vending machines, The Business Journal, Jan. 13, 2003, http://www.bizjournals.com/milwaukee/stories/2003/01/13/story9.html?t-printable.

Flexplay Web site pages, http://www.flexplay.com.

PCT International Preliminary Report on Patentability (Chapter 1 of the Patent Cooperation Treaty), Apr. 10, 2006.

* cited by examiner

CURRENT ORDER: Please review your current order, choose RENT or BUY for each item listed, then press COMPLETE ORDER
DELETE
| | | | | |
|---|---|---|---|---|
|  | Finding Nemo | RENT | $2.99 | BUY | $20.99 |
|  | Chicago | RENT | $2.99 | BUY | $20.99 |
|  | Bruce Almighty | RENT | $2.99 | BUY | $20.99 |
TOTAL: $44.97
CONTINUE SHOPPING        COMPLETE ORDER        HELP
FIG. 11

AUTOMATED BUSINESS SYSTEM AND METHOD OF VENDING AND RETURNING A CONSUMER PRODUCT

CROSS-REFERENCE TO RELATED APPLICATIONS

This application is a divisional of application Ser. No. 10/866,387, filed Jun. 11, 2004, entitled "Automated Business System and Method of Vending and Returning a Consumer Product," which claims the benefit of U.S. Provisional Application No. 60/477,619, filed Jun. 11, 2003.

BACKGROUND OF THE INVENTION

Over the years, the world of home entertainment has changed radically. These days, most U.S. households get at least 50 channels of television programming and have a color television and a VCR and/or a DVD player. The way in which pre-recorded programming is accessed by the consumer is changing rapidly providing the consumer with a wide range of options.

People have had VCRs in their homes for years, and in the United States, there are video rental stores everywhere. More and more households are adding advanced components to their entertainment setup to create home theater systems. As more and more households purchase DVD players, video game consoles, and other advanced media products, video rental stores have had to adjust their inventory to accommodate this changing demand for more advanced media, such as the digital versatile disc ("DVD"). Today, video rental stores include a variety of media, e.g., feature length film DVDs, video games, audio CDs, and VHS videos. In addition, other companies have recently entered the market to offer households a method of renting movies or other media different from the traditional practice of visiting the local video rental store.

For example, Blockbuster®, Hollywood Video®, and Movie Gallery® operate the traditional video rental store. A consumer completes a membership form to become a member of the store, which allows the consumer to rent movies, games, etc. from the available inventory for a rental fee per item. Generally, the rental fee is based on the length of time, e.g., 2 days, the consumer has until the item must be returned to the store. If the item is not returned to the store on time, the consumer is assessed an additional fee/fine for the additional length of time the consumer holds onto the item. Generally, the item is required to be returned to the same store.

NetFlix® is a mail-based method of DVD movie rental. The consumer becomes a member by paying a monthly subscription fee, which allows the consumer to select as many DVDs each month for viewing as long as the consumer has no more than three DVDs at anyone time. The consumer selects DVDs at the NetFlix web site. The DVD is mailed via first-class mail to the consumer, and the consumer returns the DVD to NetFlix using a prepaid mailer at a convenient time—there is no deadline for returning the DVD. After NetFlix receives the returned DVD, NetFlix sends out the next DVD on the consumer's selection list, which is stored on the NetFlix Internet server.

AOL/Time Warner and Cox Communications® provide pay-per-view and video-on-demand services to cable subscribers. The consumer pays a monthly fee to subscribe to the cable services, which provides access to the company's selection of movies. The consumer selects a movie in the comfort of their home and is charged a movie rental fee that appears on the consumer's monthly bill. If the consumer selects a pay-per-view movie, the movie plays on the consumer's television without interruption. If the consumer subscribes to digital cable and selects a movie through video-on-demand, the movie plays on the consumer's television, but the consumer also has VCR-like control over the movie to stop and pause as necessary.

Movielink® is a PC download method of movie rental. Several major movie studios have collaborated to provide access to movies via computer. The consumer selects a movie from the Movielink web site and downloads the file to a computer for a rental fee. The movie must be viewed on the computer and the consumer has a limited amount of time to view the movie before it is deleted from the computer memory.

BRIEF DESCRIPTION OF THE INVENTION

In one embodiment, the invention includes a method of dispensing disc-based media. The method comprises selecting the disc-based media, retrieving the disc-based media, reading a radio frequency tag on the disc-based media, and dispensing the disc-based media.

In another embodiment, the invention includes a method of servicing multiple users of a disc-based media system. The method comprises a first user selecting a first disc-based media at the disc-based media system, a second user selecting a second disc-based media at the disc-based media system at the same time as the first user selected the first disc-based media, determining an order in which to service the first and second users, retrieving the first and second disc-based media based on the order, and dispensing the first disc-based media to the first user and the second disc-based media to the second user.

In another embodiment, the invention includes an automated business system comprising a housing, a user station supported by the housing, a retrieval system operable to retrieve disc-based media stored in the housing, a RFID reader operable to read a RFID tag on the disc-based media, and a port to dispense the disc-based media.

BRIEF DESCRIPTION OF THE DRAWINGS

FIG. 11 illustrates a screen provided by a graphical user interface of the automated business systems of FIGS. 1A and 1B.

DETAILED DESCRIPTION

Figure 1A:
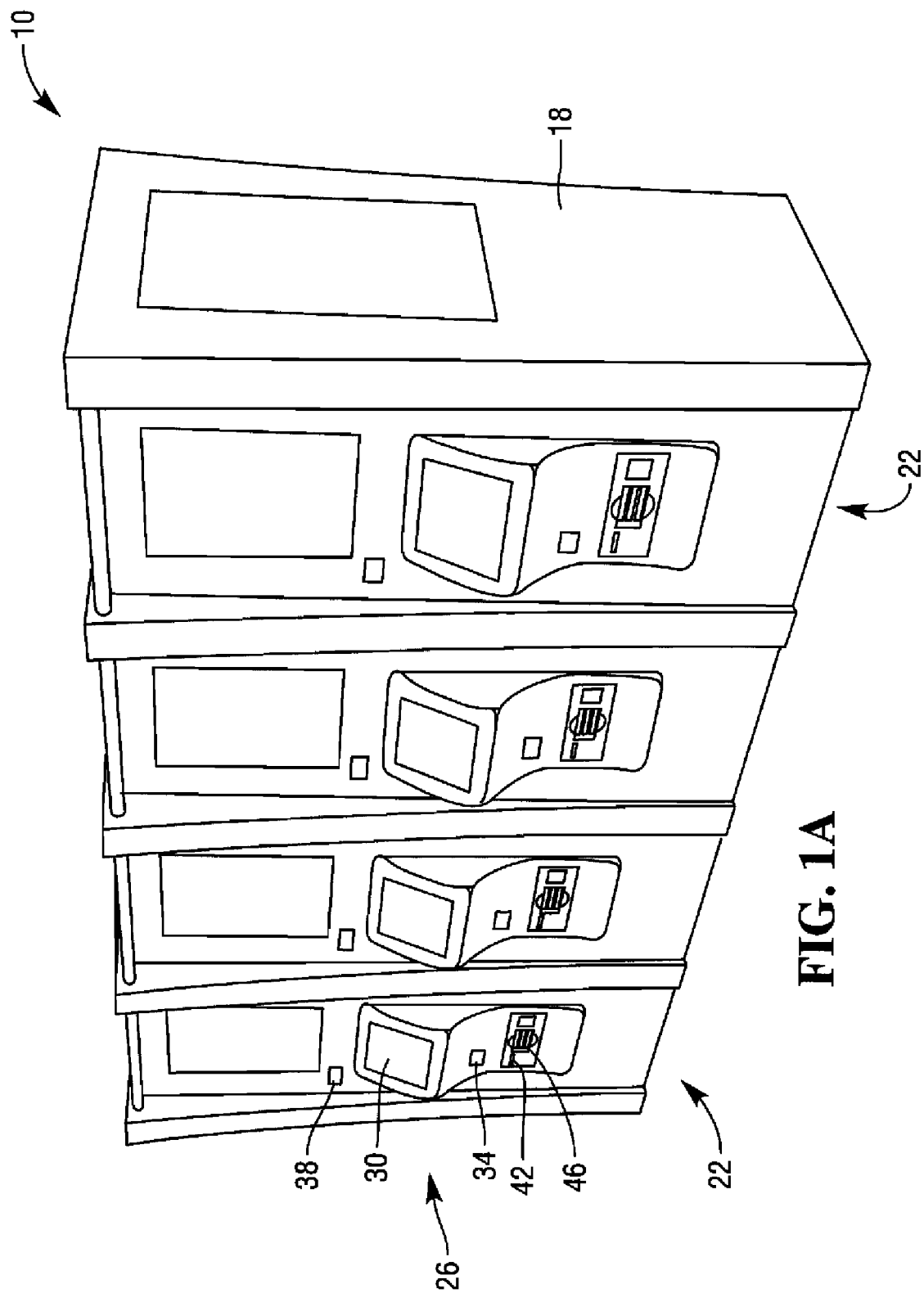
FIG. 1A illustrates a perspective view of an automated business system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Renting or ordering movies is a popular pastime. Therefore, it is desirable to have a cost-efficient, self-serving fully-automated entertainment media business system that consumers can interact with to rent, return, and/or purchase items. An embodiment of the automated business system described below relates to disc-based media, e.g., CDs, DVDs, software, and video games. However, the automated business system is not limited to disc-based media. Additional embodiments of the automated business system can also dispense audio books on tape, VHS videotapes, books, video game cartridges, food, health and beauty products, clothing, or any other item that may be desirable to rent or purchase (the product(s) in the automated business system are referred to herein as an "item").

The automated business system, according to one embodiment of the invention, can maintain and track an inventory of items. The items in the preferred embodiment are media related items, such as CDs, DVDs, and disc-based video games. The items can be uniquely identified with a radio frequency identification tag (referred to herein as "RFID tag"). The items can be added to inventory by inserting the items through a port. The RFID tag on the item can be read at any location in the automated business system and an entry can be made in the software of the automated business system for tracking inventory and other purposes. The owner of the automated business system can add new stock, configured with a unique tag, at any time by inserting new items through any access port. The new items can be activated and revealed based on a system administrator's programmed parameters. The compact footprint business system can be located anywhere for consumer use.

When the consumer desires to rent or purchase an item from the automated business system, the consumer approaches the automated business system and touches one of the touch panel displays. The consumer can browse through the available inventory for rental and/or purchase, view a video clip of one or more items, reserve one or more items for future rental and/or purchase, and/or select one or more items for rental and/or purchase.

If the consumer makes a selection for rental and/or purchase, the automated business system can retrieve the item or items and position the item or items in a port for the consumer to retrieve. When the consumer is ready to return the item(s), the consumer places the item(s) into the port, and the automated business system can recognize that the item(s) is being returned. The consumer can be charged for the item(s) upon selection and/or return.

Figure 1B:
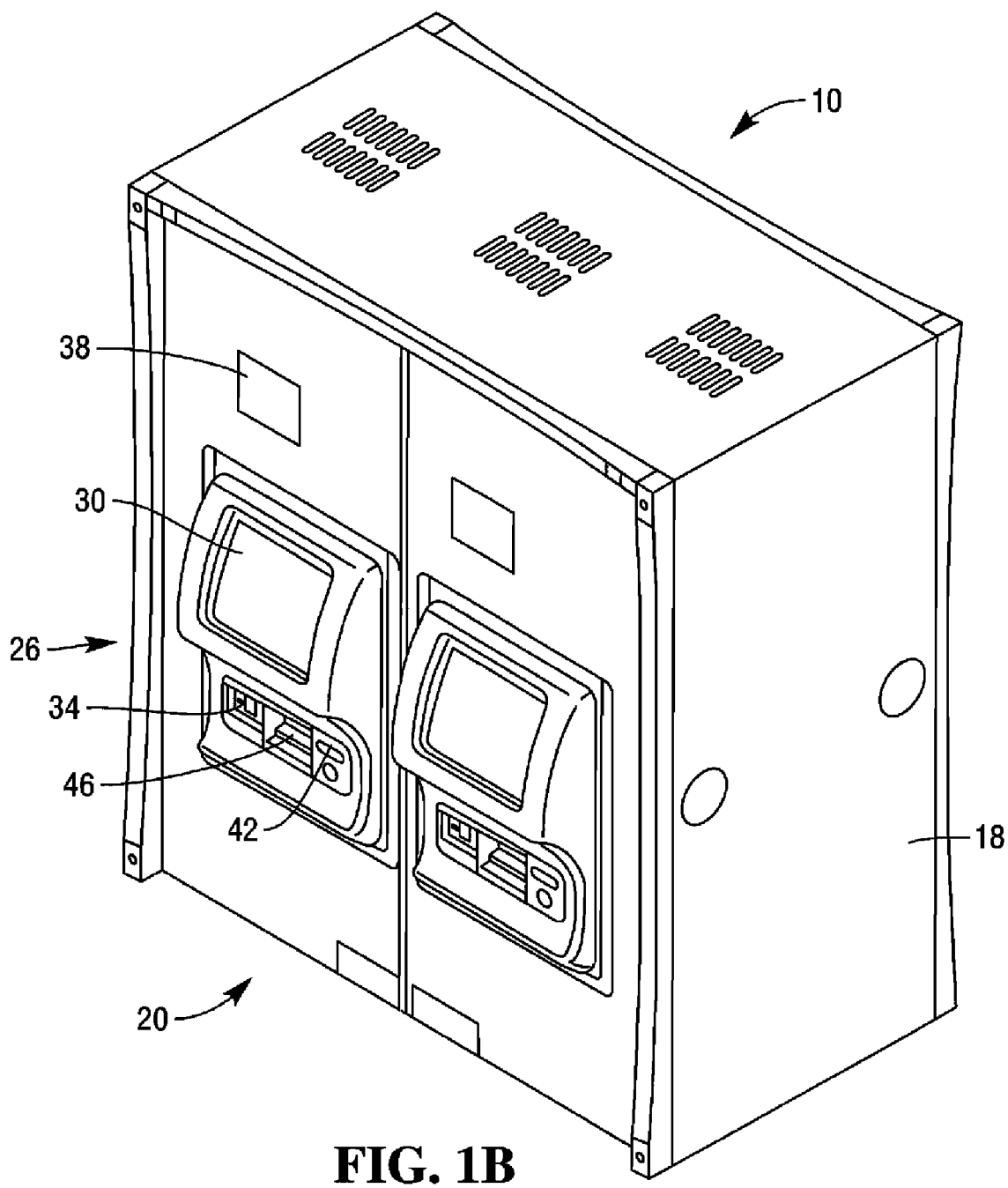
FIG. 1B illustrates a perspective view of an automated business system according to one embodiment of the invention.

A fully automated storage and retrieval system is illustrated in FIGS. 1A and 1B, according to one embodiment of the invention. The automated storage and retrieval system can function as a free-standing, fully-integrated automated business system for renting and/or selling entertainment media, educational media, and productivity software. The automated business system is completely integrated and thus is not reliant on an external system for functionality. The automated business system can utilize computer software and hardware, mechanical hardware and product storage capacity to initiate and complete a rental or sale transaction without external support.

The automated business system 10, illustrated in FIGS. 1A and 1B, can distribute disc-based media, such as DVDs, CDs, video games, and computer software. The disc-based media includes a radio frequency tag that can identify the disc-based media. Other media formats such as audio cassette tapes and VHS format cassette tapes can also be distributed through the automated business system 10.

The automated business system 10 includes a frame 14 (illustrated in FIGS. 2A and 2B), which supports a housing 18. The housing 18 can be comprised of metal, plastic, wood, composite material, or any other suitable material. The housing 18 can accommodate any number of user stations 22 and can be configured to satisfy the requirements of retailers throughout the world. The plurality of user stations 22 are positioned on the automated business system 10 to service multiple users simultaneously and to process a maximum number of transactions. The size of the automated business system 10 can be adjustable and can vary from the configuration illustrated. For example, the automated business system 10 can include 2, 4, 6, 8, etc. user stations 22. Depending on the number of user stations 22 that are included in the automated business system 10, the internal components, assemblies, and systems, as described below, may also change and are configurable to accommodate and service the number of user stations 22.

In one example, the automated business system 10 includes four user stations 22. The dimensions of the housing 18 can be about six feet long by about four feet deep by about seven feet high. These dimensions can be modified to accommodate any retail requirements. In addition, the automated business system is compliant with the Americans with Disabilities Act ("ADA").

The housing 18 can include space for brand name(s) of the owner of the automated business system 10 and any other owner identifiers. The exterior color, material type and ornamental features of the housing 18 can all be modified such that the automated business system 10 can present the desired brand(s) in the most appealing and commercially effective manner. The housing 18 can include advertising space for other businesses and/or products.

Each user station 22 can include an interaction system 26 as illustrated in FIGS. 1A and 1B. The housing 18 can support the components and systems of the consumer interaction system 26. The consumer interaction system 26 can include a display 30, which can be a standard display or a touch panel display and a card reader 34 operable to read information from a magnetic stripe on a credit card, debit card, smart card, etc. The card reader 34 can accept all available hard card payment types including credit, debit, smart, and stored value. The card reader 34 can also read information stored in an integrated circuit embedded in the hard card substrate. Additionally, the card reader 34 can write information to the integrated circuit embedded in the hard card substrate.

The consumer interaction system 26 can include a speaker system 38 operable to provide sound to the user. The speaker system 38 can be a traditional driver-based design or a unique design in that sound files played by a user at one of the user stations 22 cannot be heard by other users at adjacent user stations 22. In the latter case, each user station 22 can be uniquely configured and the audio waves of the sound file are directed to the user at the user station 22. The user station 22 can include auxiliary listening devices.

Figure 26:
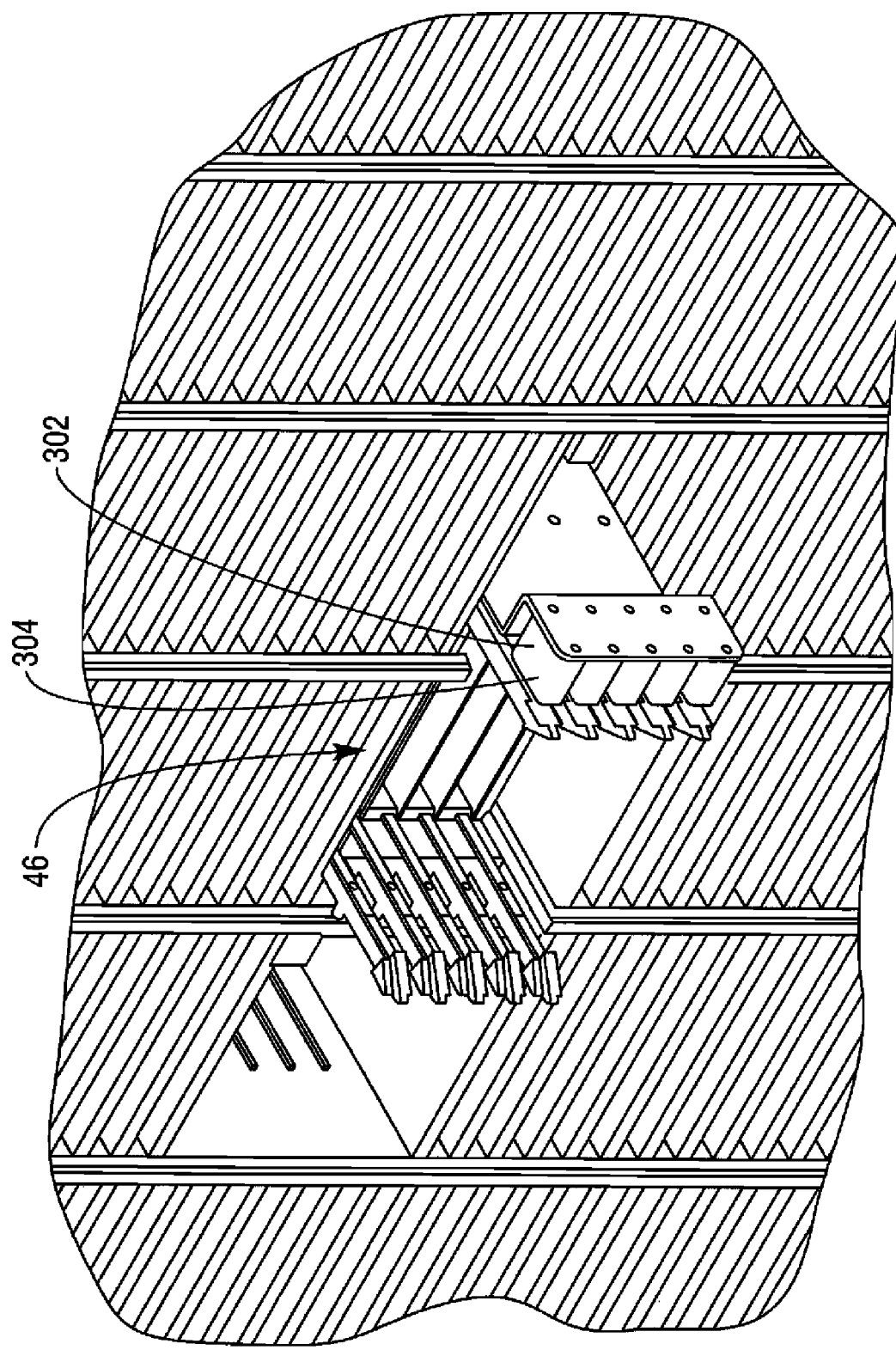
FIG. 26 illustrates a perspective view of an assembly of the automated business systems of FIGS. 1A and 1B.

The consumer interaction system 26 can include a printer 42 operable to print a receipt or any other report and a port 46 operable to dispense and receive the disc-based media. The port 46 can be formed as a five-slot array as illustrated in FIG. 26. Each slot is separated from the adjacent slot. The consumer interaction system 26 can also include advanced input and output devices such as a microphone, voice recognition devices, biometrics devices, etc.

The consumer interaction system 26, in one construction of the invention, includes a 17" touch panel display 30 (a suitable display 30 is the ELO Intellitouch 5000 17" touch monitor utilizing surface wave technology, which minimizes the loss of brightness or luminescence), a right channel and a left channel full range speaker system 38, a receipt printer 42, a magnetic stripe and smart card reader 34 (a suitable card reader 34 is the Magtek Intellistripe 65 card reader), and a five-slot disc array port 46.

The consumer interaction system 26 can include a processor 50 (illustrated in FIG. 3), such as a thin client PC appliance (a suitable processor 50 is the Neoware EON Professional 6300 thin client). The PC appliance peripherals including the printer 42, the display 30, the card reader 34, and the speaker system 38 are driven by, and coupled to, the processor 50. The consumer interaction system 26 can include additional hardware and software applications and is not limited to the hardware and software applications described herein. Additional hardware and software applications can be utilized to operate in the same or a similar manner. In addition, it should be noted that the functions of each system and/or component can be performed by hardware and/or software and/or a combination of hardware and software.

The processor 50 can communicate, via a switch 52, with a local server 54 operable to process the user requests (e.g., rent, return, purchase) entered via the consumer interaction system 26. The server 54 can communicate with a retrieval system 58 (described below) operable to receive instructions from the server 54 and retrieve a particular item within the automated business system 10. The server 54 can communicate with an administrative computer terminal 62 (described below) operable to perform diagnostic and servicing functions. The administration computer terminal 62 can also communicate with the retrieval system 58 to perform diagnostic and servicing functions. The server 54 can communicate with a network 66. The network 66 can be accessed by a remote user terminal 70 operable to communicate with the local server 54. The network 66 can also be accessed by a remote server 74 operable to communicate with the local server 54.

The network 66 can be built according to any networking technology or topology or combinations of technologies and topologies and may include multiple sub-networks. Connections between the server 54 and the network 66 can be made through local area networks ("LANs"), wide area networks ("WANs"), public switched telephone networks ("PSTNs"), Intranets, the Internet, and/or any other suitable networks.

Figure 3:
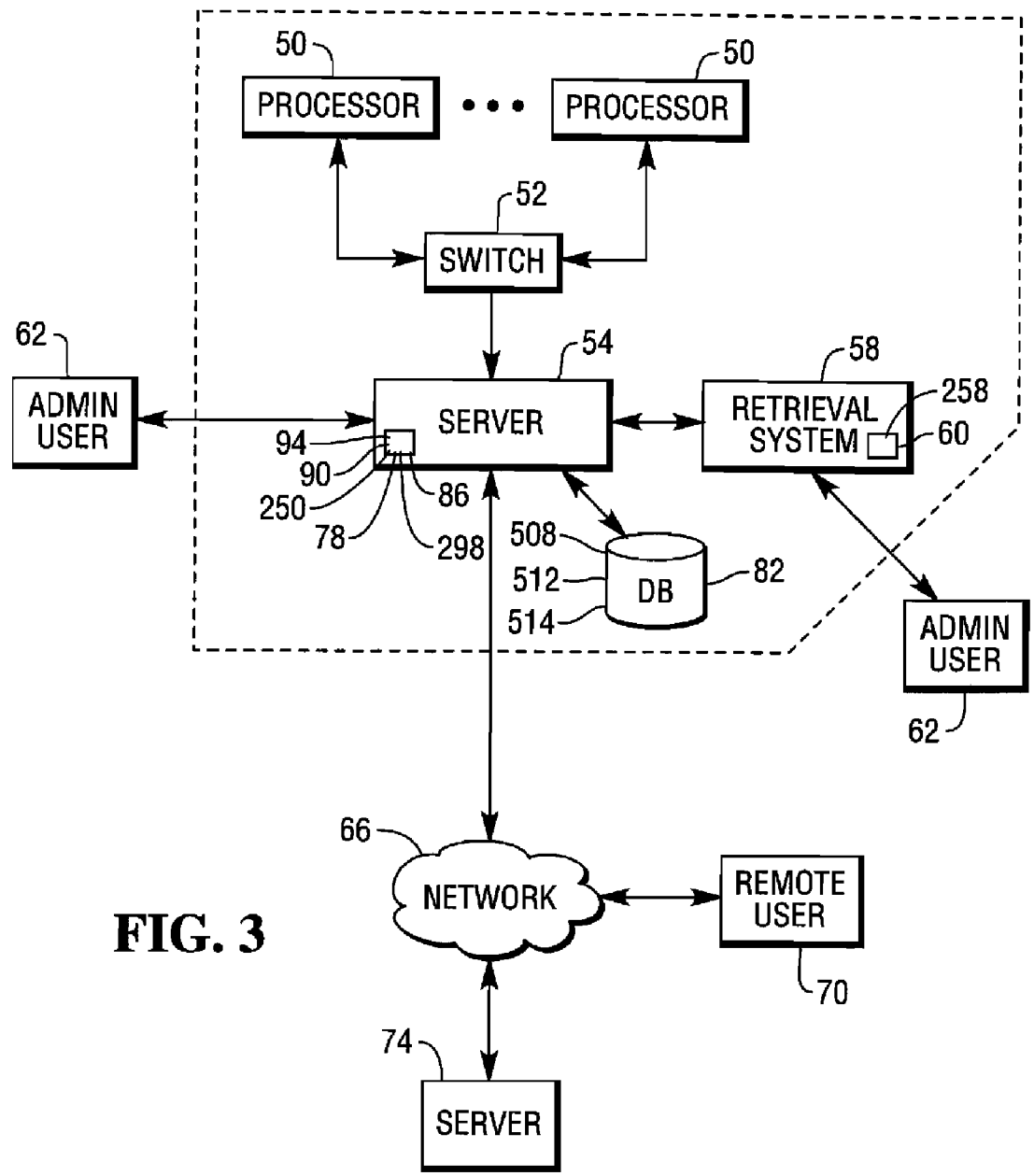
FIG. 3 illustrates a schematic of the automated business systems of FIGS. 1A and 1B according to one embodiment of the invention.
Figure 4:
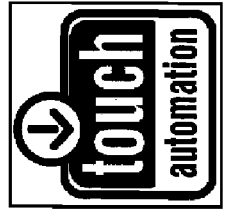
FIG. 4 illustrates a screen of a service program that can be used to service the automated business systems of FIGS. 1A and 1B.
Figure 5:
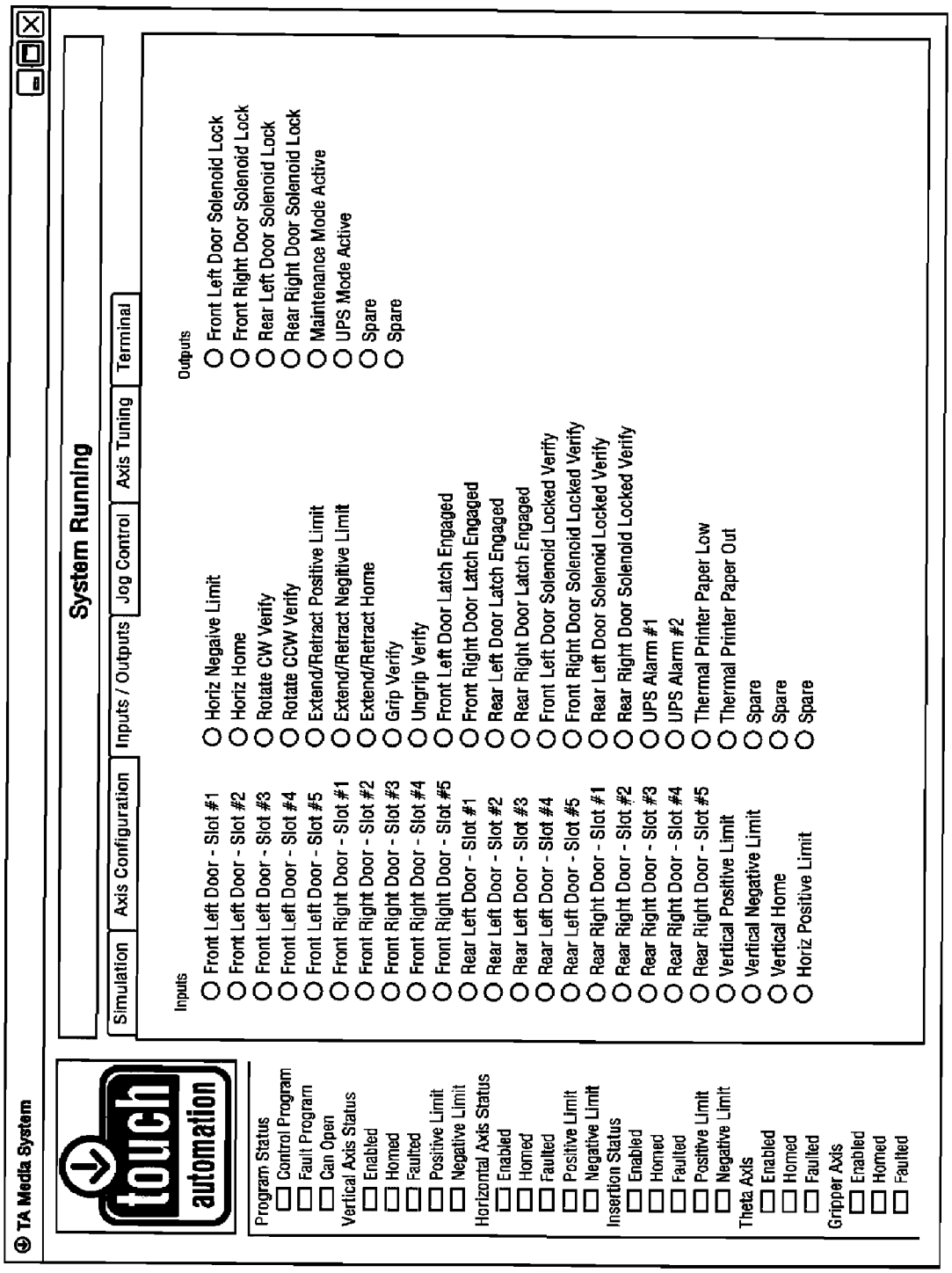
FIG. 5 illustrates a screen of a service program that can be used to service the automated business systems of FIGS. 1A and 1B.
Figure 6:
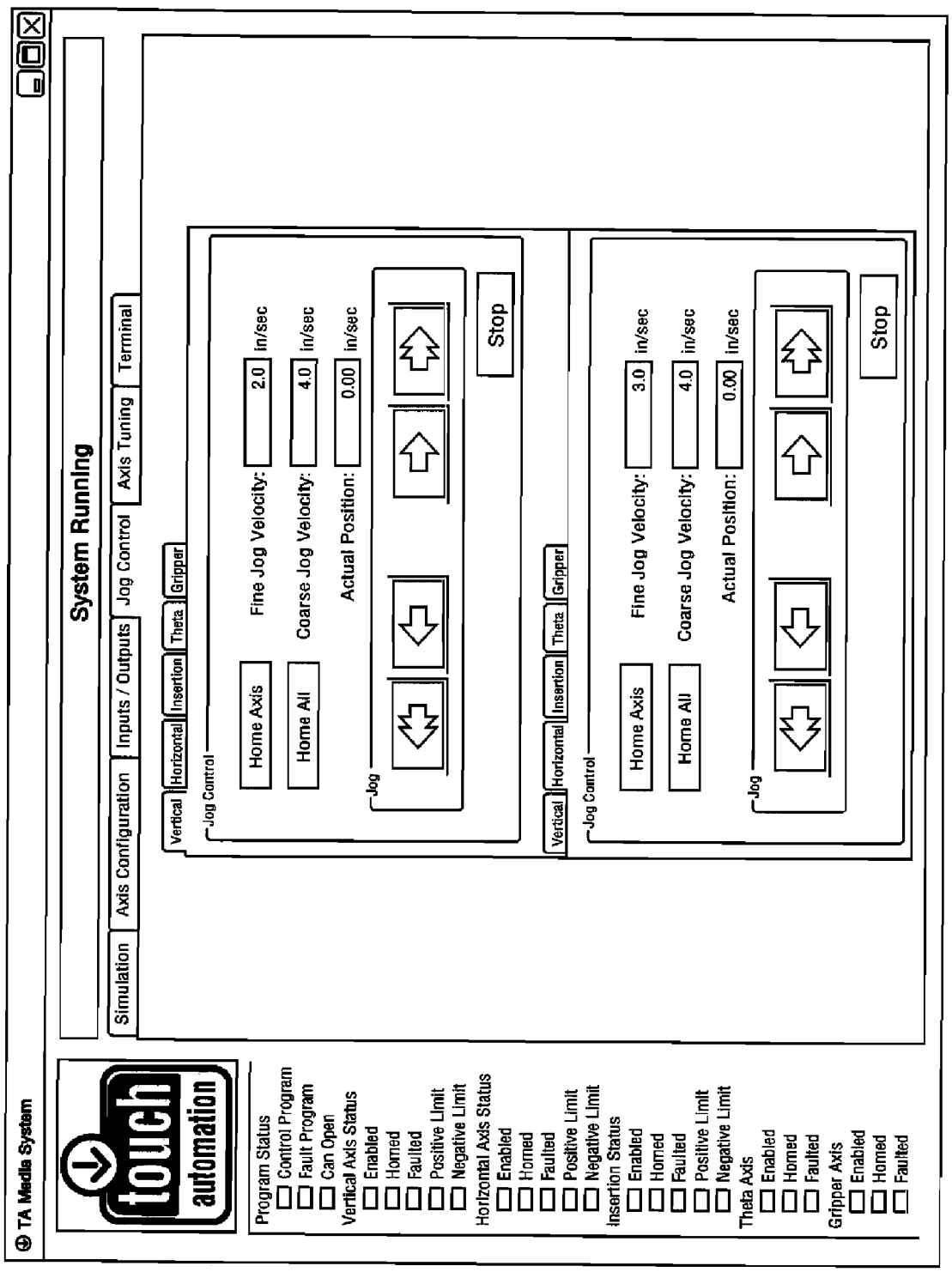
FIG. 6 illustrates a screen of a service program that can be used to service the automated business systems of FIGS. 1A and 1B.
Figure 7:
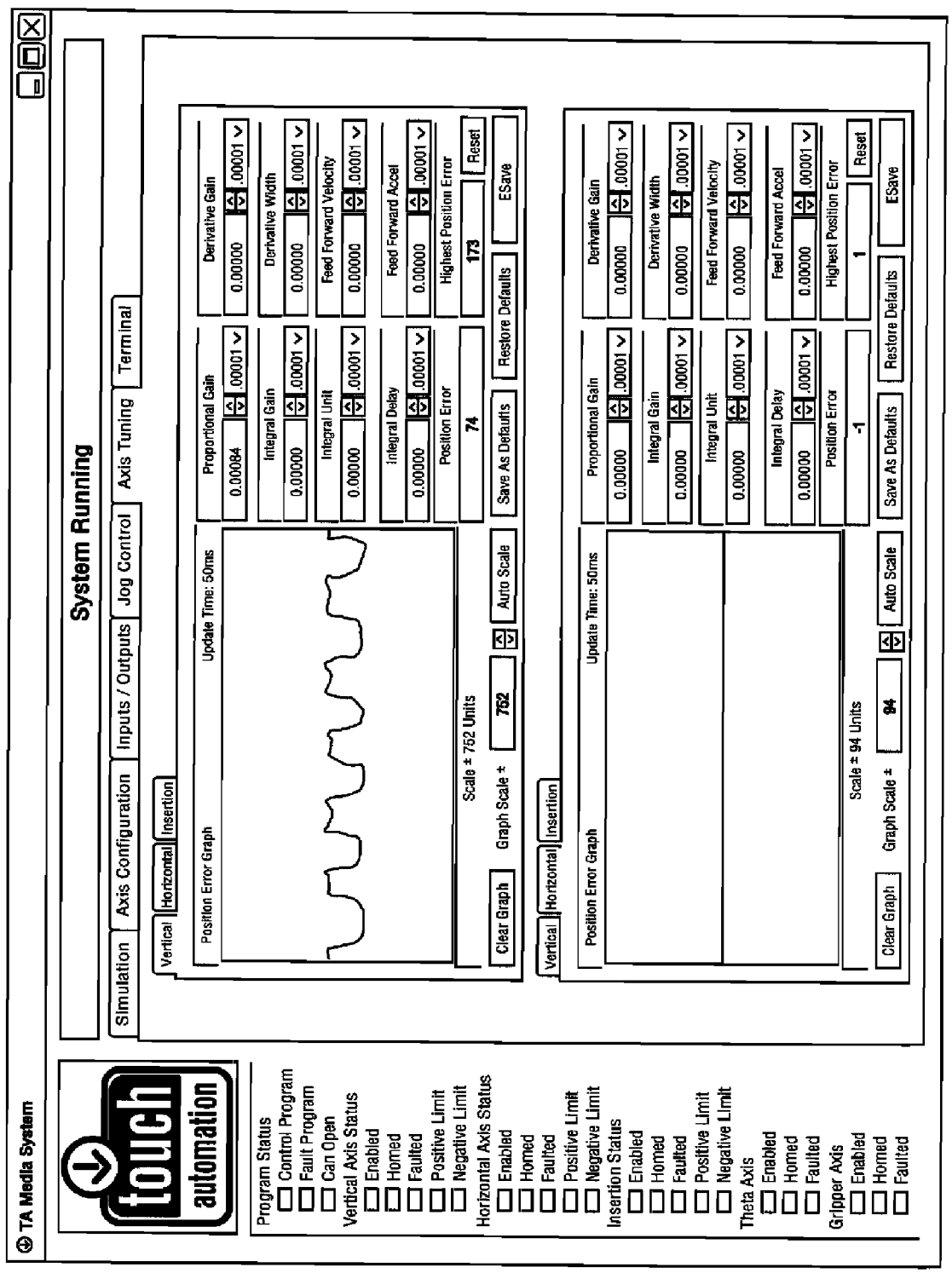
FIG. 7 illustrates a screen of a service program that can be used to service the automated business systems of FIGS. 1A and 1B.

The two-way arrows in FIG. 3 represent two-way communication and information transfer between the network 66, the server 54, the remote user 70, and the server 74, and between the server 54, the processors 50, the retrieval system 58, and the administrative computer terminal 62.

The servers 54 and 74 can include an operating system for running various software programs and/or a communications application. In particular, the server 54 can include a software program(s) 78 that can communicate with the processors 50, the retrieval system 58, the administrative computer terminal 62, and the network 66. The server 54 can include the same and/or additional software program(s) that can communicate with the remote user terminal 70 and the server 74 via the network 66. The server 54 can communicate with a database 82 operable to store information received from the processors 50, the server 54, the retrieval system 58, the administrative computer terminal 62, the server 74, and the remote user 70. The database 82 can be hosted by the server 54 or hosted by the remote server 74.

In one construction of the invention, the automated business system 10 features a LAN comprised of a server 54, multiple thin client PC appliances and a high performance switch 52. The server 54 can include Microsoft Windows Server 2003 operating system and SQL Server Standard Edition. The server 54 can utilize other software for operation. The server 54 can include redundant power supplies, error correcting memory, a 72G RAID 5 hard disc cluster and 1 G of RAM. The server 54 can also utilize multiple, dual port Ethernet network interface cards.

The server 54 is connected to a 200 MB switch 52 that is in turn connected to each of the thin clients. The LAN data transmissions can occur over category five cabling or any other suitable network cable or wireless transmission technology.

The thin clients provide delivery of high resolution, full motion video that can be stored and transmitted by the server 54. The zero-footprint thin client is mounted behind the touch panel display within the consumer interaction system 26. The thin clients can include Microsoft embedded XP operating system and utilize 512 MB of RAM in lieu of a hard drive where the operating system and application images are stored.

The server 54 can incorporate a high transmission rate modem enabling the server 54 to communicate with external computing devices.

The network 66 allows a remote computer terminal 72 to communicate with the server 54 via the Internet. The server 54 can be accessed by a public web site that communicates with the remote computer terminal 72 to provide additional information to the user such as, but not limited to, item(s) available for rent or purchase, location of the item(s), access to a personal account to review current items rented, and the ability to make reservations.

The administrative computer terminal 62 can directly communicate with the server 54 and/or motion controller 60 (described below) to remotely service the automated business system 10. The administrative computer terminal 62 can adjust the speed, sensitivity, and timing of the retrieval system 58, can monitor the status of the paper in the printers 42, can verify the power status, and status of the doors of the automated business system 10 as shown in example service screens and as illustrated in FIGS. 4-7.

The software program(s) 78 that resides on the server 54 can include a point of sale software application 86 ("POS application"), which is operable to manage the transactional activity between the user and the server 54. The POS application 86 can manage all of the transactional data and can coordinate multiple simultaneous transactions from the plurality of user stations 22. The POS application 86 can transmit commands to the retrieval system 58 via a pre-configured application programming interface. The POS application 86 can transmit data to external systems (via the server modem) including, but not limited to, administrative servers, such as server 74, legacy systems, and remote user terminals 70. The remote user terminals 70 communicate with the server 54 via the network 66, which can be the Internet.

The POS application 86 can transmit data to any external system via the server modem in real time or in batch mode. The data transmission can be customized to accommodate a specific information system need. The POS application 86 can also transmit data in an extensible markup language (XML) format. The data can be transmitted in an authenticated, encrypted, or other secure manner.

The POS application 86 can initiate and obtain authorization or authentication for each payment attempt before delivering the requested item(s) to the user. The POS application 86 can be programmed to initiate and obtain the third party service provider payment authorization or authentication directly, or the POS application 86 can be programmed to transmit a request for authorization to the retail store's POS infrastructure which can obtain payment authorization in the same or similar manner in which all other host hard card transactions are authorized at the retail establishment. The POS application 86 can also initiate and obtain authorization for gift cards or other stored value cards.

Payment authorization can occur in one of several different ways. When an item is purchased through the automated business system 10, the POS application 86 can initiate and obtain approval, utilizing a third party service provider, to charge or debit the account number presented by the user. The approval is generally received before the item(s) are dispensed. When approval is received via the third party service provider, the approval code is associated with the specific transaction and can be stored in the database 82. The item(s) can then be dispensed to the user.

When an item is rented through the automated business system 10, the POS application 86 may only initiate and request that the account number presented by the user is authentic or valid prior to dispensing the item(s). When the item(s) are returned to the automated business system 10 and the transaction's value is determined, the POS application 86 can initiate and obtain authorization to charge or debit the account number presented by the user for the full transaction value. Alternatively, the POS application 86 can initiate and obtain authorization, utilizing a third party service provider, to charge or debit the account number presented by the user prior to dispensing the item(s).

The POS application 86 is generally fault tolerant. In the event of a communications failure, such that the automated business system 10 cannot authenticate or authorize a transaction, the POS application 86 can stop processing the pending transactions or may continue to process transactions without external authentication or authorization. The administrator or owner of the automated business system can determine whether the POS application 86 can continue to process transactions or can stop processing the pending transactions. If the administrator determines that the server 54 should continue to accept transactions without the ability for external communications, once external communications are restored, the POS application 86 can obtain authorization or authentication for all transactions that occurred while external communications were not available.

The POS application 86 can provide a high level of programming flexibility for the owner of the automated business system 10. For example, the POS application 86 can enable the owner to apply any type of stock keeping unit description for the items within the automated business system 10. In addition, one field or component of the stock keeping unit description can accommodate a full motion video file. The POS application 86 can be updated periodically to include descriptions and full motion video files of new items available in the automated business system 10. The POS application 86 can be updated by inserting an item(s) such that the server 54 can read the RFID tag on the item, can store the information in the database 82, and can update the inventory list and the fall motion video files. The POS application 86 can also be updated by downloading data from the remote server 74, which can be updated with information regarding the new inventory item(s) added to the automated business system 10 and full motion video files. The full motion video file then becomes part of the inventory record of the automated business system 10. The user can view the video file(s) at the display 30 of the consumer interaction system 26 to preview or better understand the contents of the item(s) selected or contemplated for selection.

The POS application 86 can include a feature or suggestion module 90 that can suggest a different item(s) to the user that may be of interest to the user based on certain attributes of the item selected by the user. In operation, the suggestion module 90 can query the database 82 that includes attributes for each item in the automated business system 10. For example, to provide a suggestion(s), the suggestion module 90 can characterize each item (e.g., media title) across many attributes including, but not limited to, feature and supporting cast members, director, author, producer, distributor, subject matter, category, the media title's rating, the pace of dialog, the tempo of the soundtrack, setting, volume of dialog, complexity of subject matter, complexity of dialog, degree of violence/aggression, chronological sequencing, age of feature cast members, etc., to identify other items (e.g., media titles) with similar attributes. The attributes of each item are determined/quantified by the owner/operator of the automated business system 10 prior to the item being inserted into the automated business system 10.

The suggestion module 90 operates to compare each attribute of the selected item with each attribute of every other item in the automated business system 10, and a degree of similarity, expressed as a percentage, between the selected item and every other item in the automated business system 10 is determined/quantified (a suitable suggestion module 90 is available from Savage Beast or My Best Bets). When the user selects an item (e.g., a media title) to review at the consumer interaction system 26, additional items (e.g., media titles) that are similar in nature are suggested to the user for review. These suggested items (e.g., media titles) are listed in descending order based on the degree of similarity.

The POS application 86 can enable the owner of the automated business system 10 to determine a fee structure that is to be applied to each transaction, class of transactions, or all transactions; and also to each user, class of users, or all users. The POS application 86 can enable the owner of the automated business system 10 to adopt a 'fee- for-transaction' pricing methodology or alternatively to apply a 'subscription-fee' pricing methodology. If the subscription fee pricing methodology is applied, the user pays a monthly (or some other interval such as quarterly or annual) fee in advance to enjoy a specified level of transaction activity (or unlimited activity) with the automated business system 10. The level of transaction activity is specified by the owner of the automated business system 10. The owner of the automated business system 10 can use a simple, one-tier subscription approach or may adopt a more complex, multiple tier subscription approach. If the 'fee-for-transaction' pricing methodology is applied, the user pays an amount for each transaction.

The POS application 86 can also enable the owner of the automated business system 10 to initiate a complex and systematic in-store promotional campaign. The promotional campaign can include, but is not limited to, cross-sell, up-sell and ancillary product promotions. The promotional content can be determined based on information gathered about the user during the user's interaction with the automated business system 10. The promotion can be issued to the user in a variety of ways, all of which ensure that the user can receive the promotion while the user remains in the store.

The following methods can be used to issue the promotion to the user: 1) using a pop up dialog box that appears on the consumer interaction system 26 while the user is browsing through the items available in the automated business system 10. The pop up window can indicate the scope of the promotion and redemption instructions; 2) a printed promotion can be issued to the user during or after the user's shopping/selection session. The printed promotion can be executed in such a way as to be readable and redeemable at the consumer interaction system 10; 3) an all-digital promotion can be conveyed to the user and applied to the user's virtual 'account' provided the user assents to the promotion. In this case the value of the promotion can be associated with the user's account to be redeemed during a subsequent, qualifying transaction (one that satisfies the promotion's requirement or set of requirements).

The POS application 86 can capture data for each user shopping session. This data capture can take place passively by recording each of the user's choices/selections. Or the data can be captured actively by asking the user to take a brief survey, or to provide an opinion on a certain matter or of a certain product, etc. The POS application 86 can analyze the data and the results can be used in the most effective manner to further the commercial goals of the owner of the automated business system 10. The POS application 86 can be programmed to disassociate the user's name with the session data captured to ensure consumer privacy.

The POS application 86 can sequence demand on the automated business system 10 to ensure that each transaction initiated by a user is serviced in the order that it was received. For example, if a plurality of users have selected one or more items, the POS application 86 can determine which request was made first and which request was made second, etc. The POS application 86 can communicate with the retrieval system 58 the order in which to retrieve each item.

The POS application 86 can permit the user to select up to five items and request that all items be dispensed in a single transaction. The five items can be dispensed through the five-slot array port 46. The automated business system 10 can also be expanded to allow the user to request additional items in a single transaction. Once the request is received by the server 54 of the automated business system 10, the POS application 86 can transmit a series of commands to the retrieval system 58 to retrieve each item requested/selected. The retrieval system 58 is unique in that it can dispense to any port 46 location in the automated business system 10 to accommodate the plurality of consumer interaction systems 26. Each port 46 includes a five-slot array that can be serviced by the retrieval system 58. The automated business system 10 can read the RFID tag on the item as it is dispensed through the port 46 to verify that the correct item is being dispensed.

The automated business system 10 can operate similarly when the user returns up to five items in a single transaction. During the return, the user can insert the item(s) into one of the five slots of the port 46, and the automated business system 10 can automatically read the RFID tag mounted on the item(s) and then position the item(s) in an internal storage position or bin.

The POS application 86 can include a graphical user interface 94 with which the user interacts at the consumer interaction system 26. The graphical user interface 94 can be presented to the user via the display 30 at the consumer interaction system 26. Because the automated business system 10 can hold thousands of items, the graphical user interface 94 can present a variety of effective search mechanisms to the user to be able to select the desired item quickly. The graphical user interface 94 may also present the most relevant information to the user based on an analysis of historic transaction activity allowing the user to effectively and efficiently shop for the desired item(s), and once an item(s) is selected, to complete the transaction.

The graphical user interface 94 can enable the user to complete a transaction in as few as four actions and/or screen touches. For example, the user can approach the automated business system 10 and can select 'Movies', then select a movie title, then select 'Add To Cart', then select 'Complete Order', and the item will appear at the port 46. As another example, the user can approach the automated business system 10 and can select 'Rent', then select 'Category', then select 'Drama', then select a title from a list of items presented, and the item will appear at the port 46.

Upon return of the item(s), the user is not required to interact with the consumer interaction system 26 in order to execute a return, except to place the item(s) in the port 46. If desired, the user can interact with the display 30 to initiate and complete an item return. Upon recognizing that an item has been inserted into the port 46, the automated business system 10 can broadcast a question or message to the display 30 to the corresponding consumer interaction system 26 asking the user whether or not the user would like a receipt. If the user selects 'Yes', a receipt can be issued as soon as the POS application 86 has reconciled the transaction. The receipt can be printed by the printer 42 of the corresponding consumer interaction system 26. If the user does not react to the query within a predetermined amount of time (e.g., 20 seconds), the automated business system 10 can return the display 30 of the consumer interaction system 26 to idle or to a screen saver mode. The POS application 86 can reconcile and close the transaction whether or not a receipt is printed.

The graphical user interface 94 can support most foreign languages and transactions denominated in most currencies to ensure that the automated business system 10 most appropriately suits the deployment location/geography and user demographic composition.

Figure 8A:
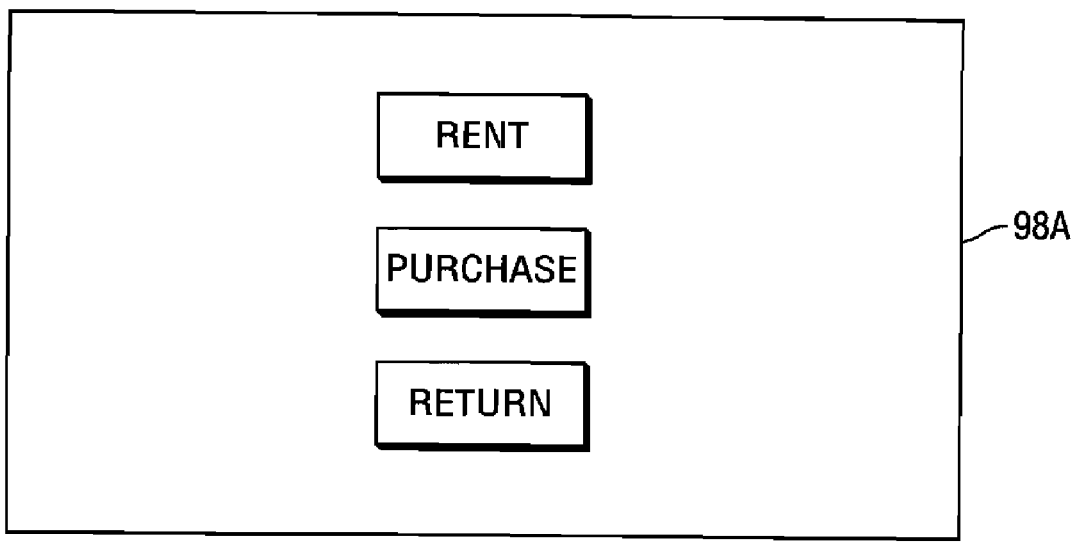
FIGS. 8A and 8B illustrate a screen provided by a graphical user interface of the automated business systems of FIGS. 1A and 1B.
Figure 9A:
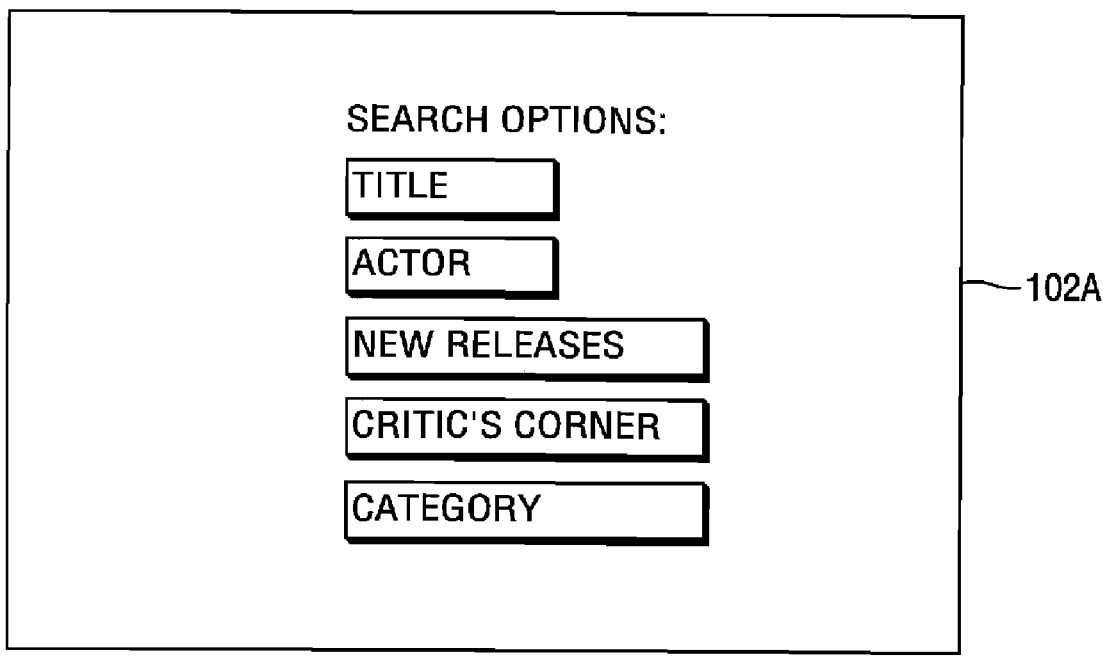
FIGS. 9A and 9B illustrate a screen provided by a graphical user interface of the automated business systems of FIGS. 1A and 1B.
Figure 8B:
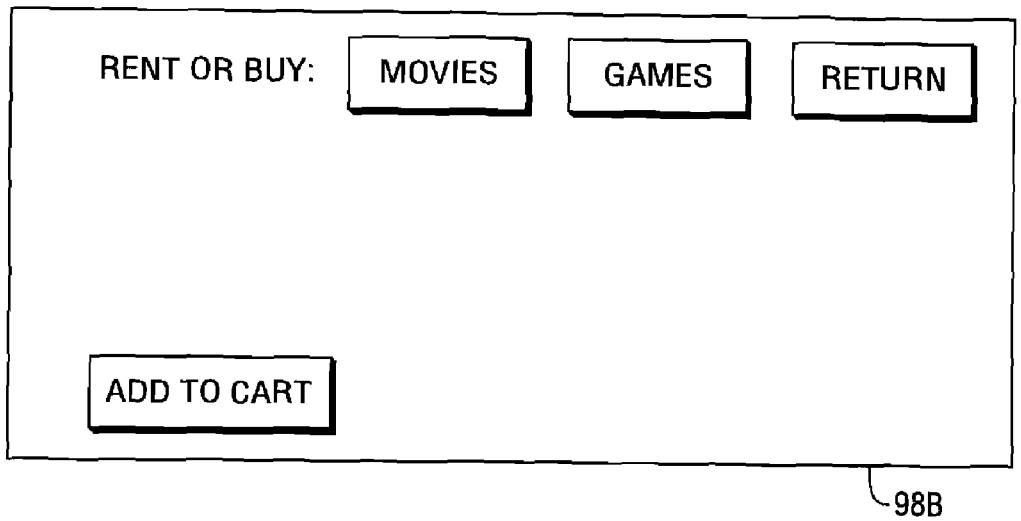

The automated business system 10 can provide a variety of efficient ways in which the inventory stored within the system can be selected. In one embodiment, during a selection process, the graphical user interface 94 presents various questions and options on the display 30 of the consumer interaction system 26. The graphical user interface 94 is under control of the POS application 86 and displays the commands in a user-friendly format on the display 30. As illustrated in FIGS. 8A and 8B, the graphical user interface 94 can provide the user with various display screens and options. For example, graphical user interface 94 can transmit display screen 98A and/or 98B to the display 30 and ask the user for the type of transaction to be performed with the automated business system 10, e.g., rent an item(s), purchase an item(s), or return an item(s) or provide a selection of the different types of media (e.g., movies, games, music) available. If the user selects the option to rent an item(s) or purchase an item(s) on display screen 98A in FIG. 8A, the user is provided with a variety of options to search the item database 80. For example, the graphical user interface 94 can transmit display screen 102A as illustrated in FIG. 9A to the display 30. The search options can include, but are not limited to, search by a Title, a Category, an Actor, New Releases, and Critic's Corner.

Figure 9B:
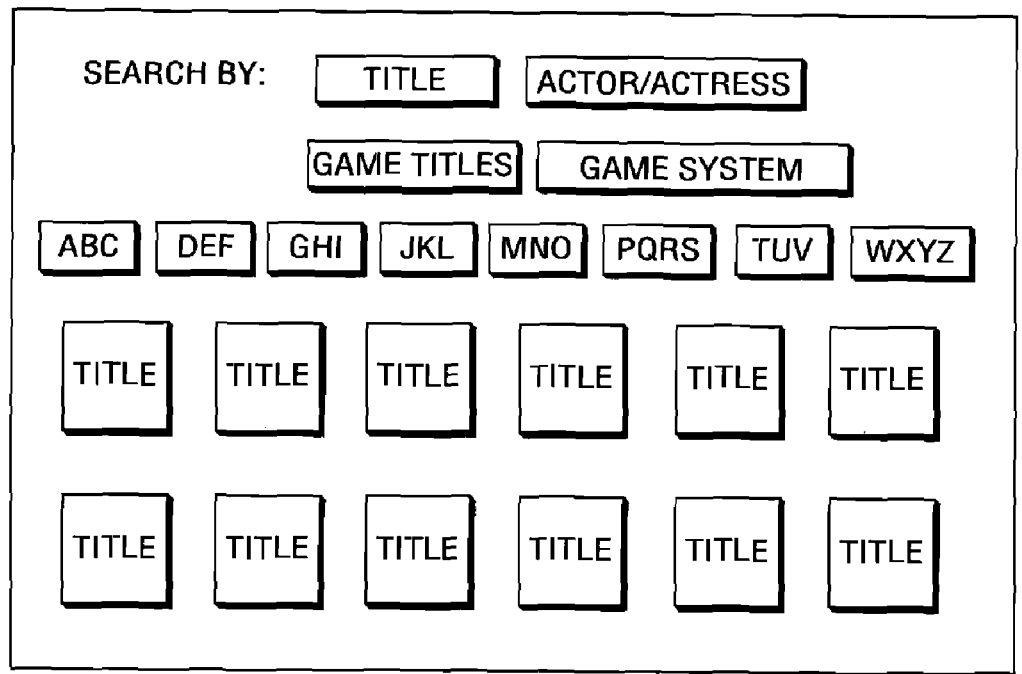

If the user selects 'Movies' on display screen 98B in FIG. 8B, the user is provided with various options to search the item database 80. For example, the graphical user interface 94 can transmit display screen 102B as illustrated in FIG. 9B to the display 30. The user can search the movie titles by alphabetical order and/or search movies based on actor/actress as illustrated in FIG. 9B.

For example, if the user selected the Title search option, the graphical user interface 94 can transmit a display screen including letters and numbers to the display 30. The user is asked to select the letter or number presented on the display 30 that corresponds with the first letter or number found in the item title. The POS application 86 can then search the database 82 for the titles of the item(s) that satisfy the selected letter(s) and/or numerical entry and can transmit the search results (e.g., all item titles that begin with the letter or number selected by the user) to the graphical user interface 94 for display on the display 30.

For example, if the user selected the Category search option, the graphical user interface 94 can transmit a display screen including various category selections, such as types of movies (e.g., mystery, drama, comedy, Oscar winners, etc.) to the display 30. The user is asked to select from the possible item categories, such as types of movies (e.g., mystery, drama, comedy, etc.). The POS application 86 can then search the database 82 for the titles of the item(s) that satisfy the selected category and can transmit the search results (e.g., all item titles that are associated with the selected category) to the graphical user interface 94 for display on the display 30.

For example, if the user selected the Actor search option, the graphical user interface 94 can transmit a display screen including a gender selection option to the display 30. The user is asked to select 'Male' or 'Female'. If the user selected 'Female', the POS application 86 can search the database 82 for all female actors featured in anyone of the items and can transmit the search results to the graphical user interface 94 for display in an order (e.g., alphabetical order by first name or last name) on the display 30. If the user selected 'Male', the POS application 86 can search the database 82 for all male actors featured in anyone of the items and can transmit the search results to the graphical user interface 94 for display in an order (e.g., alphabetical order by first name or last name) on the display 30. After the user has selected an actor, the POS application 86 can search the database 82 for the item(s) that include the selected actor and can transmit the search results (e.g., all item titles that include the selected actor) to the graphical user interface 94 for display on the display 30. The graphical user interface 94 can display the results in a particular order and/or the user can sort the results. For example, the results can be sorted to reveal the most recently released movie first and the oldest released movie last. The search results can be sorted in any manner selected by the user.

The actor-based search may include an image of the actor's face next to his or her name. Studies have determined that often consumers can recognize a face more readily than they can remember an actor's name.

For example, if the user selected the New Releases search option, the POS application 86 can search the database 82 for new movie releases that have been introduced within a certain period of time (e.g., 120 days) and can transmit the search results to the graphical user interface 94 for display on the display 30. The graphical user interface 94 can display the search results in an order based on the date the item(s) became available at the automated business system 10 and/or when the item(s) were first made available to the public. The search results can be sorted in any manner selected by the user.

For example, if the user selected the Critic's Corner search option, the graphical user interface 94 can transmit a display screen including a list of media critics to the display 30. The user is asked to select from the possible media critics. The POS application 86 can then search the database 82 for the item(s) recently recommended and/or critiqued by the selected media critic and can transmit the search results to the graphical user interface 94 for display at the display 30.

Figure 10:
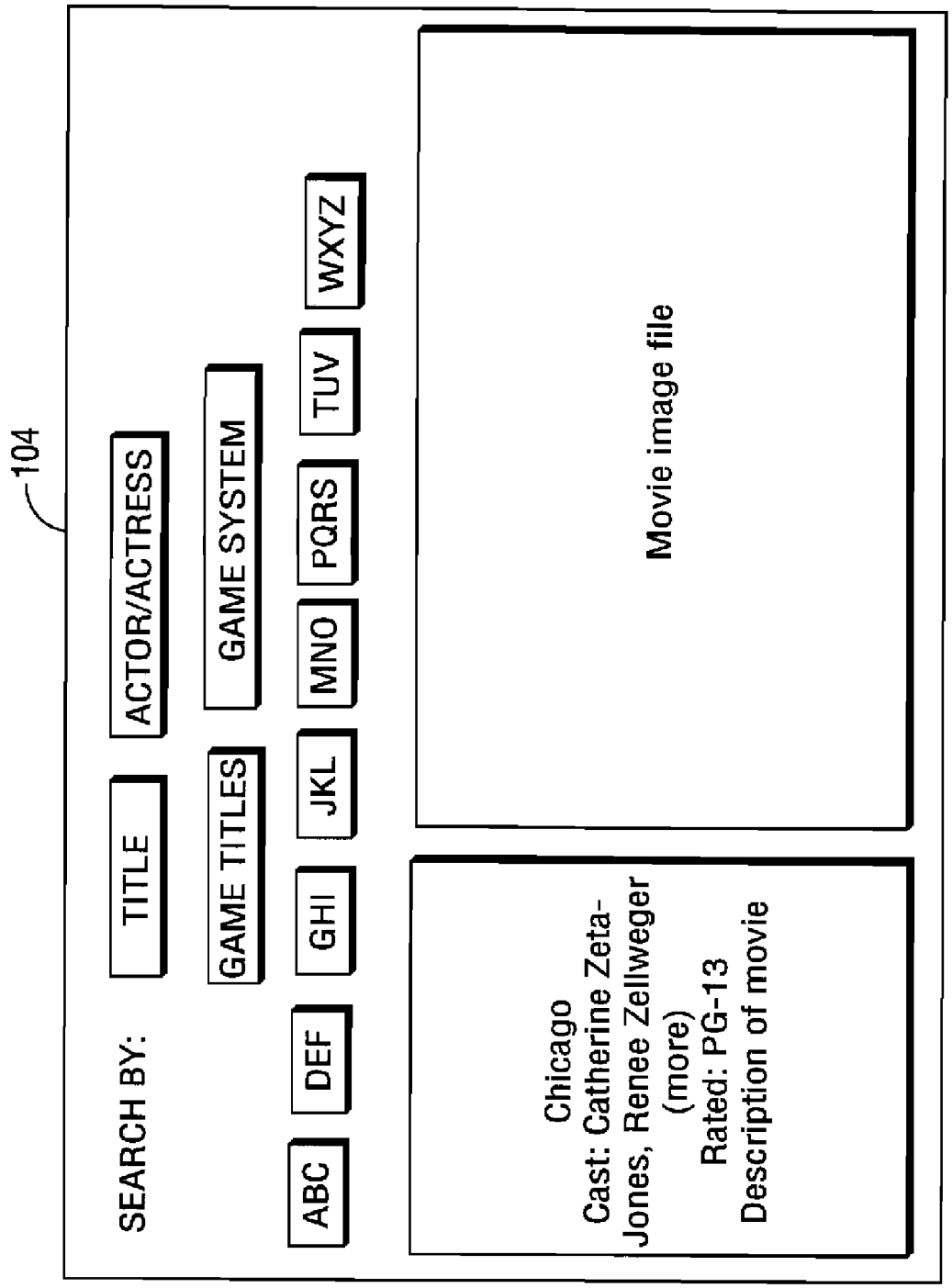
FIG. 10 illustrates a screen provided by a graphical user interface of the automated business systems of FIGS. 1A and 1B.

Once the user reaches the title level of the available item(s) (using any of the search mechanisms described above), the POS application 86 can transmit to the graphical user interface 94, a display screen 104 illustrated in FIG. 10 including a narrative description of the media title, a corresponding image depicting the media packaging, and a full motion preview of the entertainment media selected. The POS application 86 can search the database 82 for the selected motion video file (e.g., motion video trailer) and can transmit the motion video file to the graphical user interface 94 for display on the display 30. The full motion video file can be interrupted at any time by the user or watched in its entirety. Studies have determined that consumers can achieve a more thorough understanding of the item if they are able to view a full motion video trailer about the item.

The user can reserve an item(s) if the particular item(s) is not available at the time of the visit. While the user is making a selection (using any of the search mechanisms described above), the POS application 86 can determine whether the item(s) is available. The POS application 86 and server 54 can execute the user driven searches rapidly ensuring that the user realizes a near-immediate response. If the item(s) is not available for rent or purchase, the POS application 86 can transmit a 'reserve' selection to the graphical user interface 94 for display on the display 30. The user can select the 'reserve' option to be able to rent or purchase the item(s) when it becomes available. The item(s) can be reserved for a predetermined amount of time after it becomes available. The server 54 can initiate an email notification to the user via the network 66 to inform the user that the item(s) has become available. Additionally, once a user has selected an entertainment media title and placed it in a virtual shopping cart (illustrated in FIG. 11 on display screen 108), the unit of inventory having the selected title can be automatically quarantined by the POS application 86 to ensure that the selected title is available to the user upon the user completing the transaction. This feature allows the automated business system 10 to service many users simultaneously.

The display 30 of the consumer interaction system 26 can display or broadcast a promotional message and/or scroll when the consumer interaction system 26 is not in use. The promotion can be designed by the owner of the automated business system 10 to introduce the automated business system 10 and can provide incentives to new and/or existing users.

The automated business system 10 can include the retrieval system 58 illustrated in FIGS. 2A, 2B, 12-24, and 26-27 according to one embodiment of the invention. The POS application 86 on the server 54 can communicate with the retrieval system 58 to retrieve a particular item within the automated business system 10. The retrieval system 58 can include a controller 60 (illustrated in FIG. 3) operable to receive commands from the POS application 86 and transmit the commands to the retrieval system 58. A suitable controller 60 is the ACR9000 and can be programmed in Acrobasic. The retrieval system 58 can support multiple simultaneous users and can service each user directly at each user station 22.

The retrieval system 58 is supported by the frame 14. The retrieval system 58 includes a multi-axis motion control system operable to store and retrieve the requested item(s). The retrieval system 58 retrieves the item(s) from its stored location within the automated business system 10 and delivers the item to the user through the port 46. The retrieval system 58 accepts a returned item(s) and transports the item(s) to the nearest available storage bin or prescribed location.

Figure 2A:
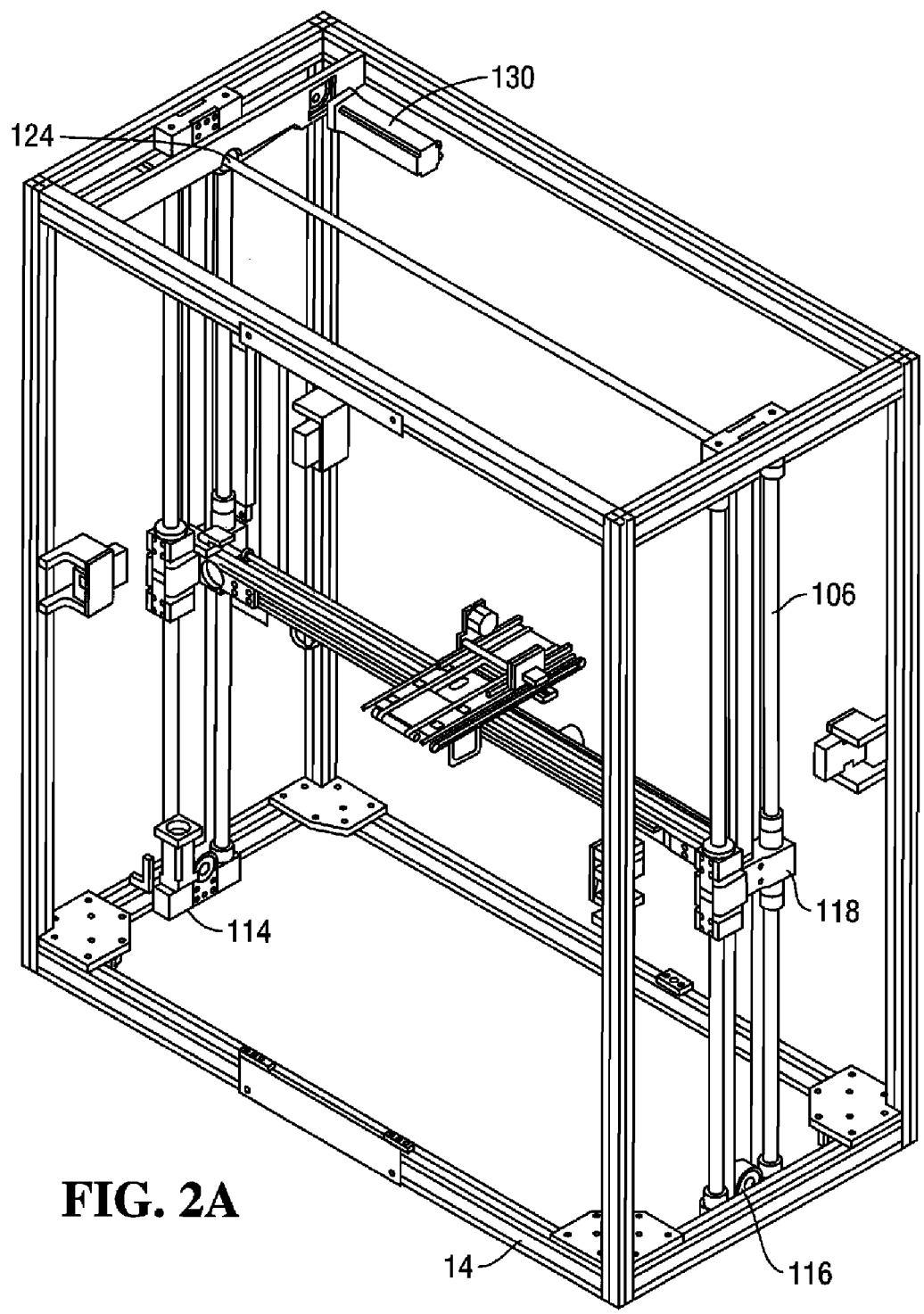
FIGS. 2A and 2B illustrate a perspective view of a retrieval system of the automated business systems of FIGS. 1A and 1B according to one embodiment of the invention.
Figure 2B:
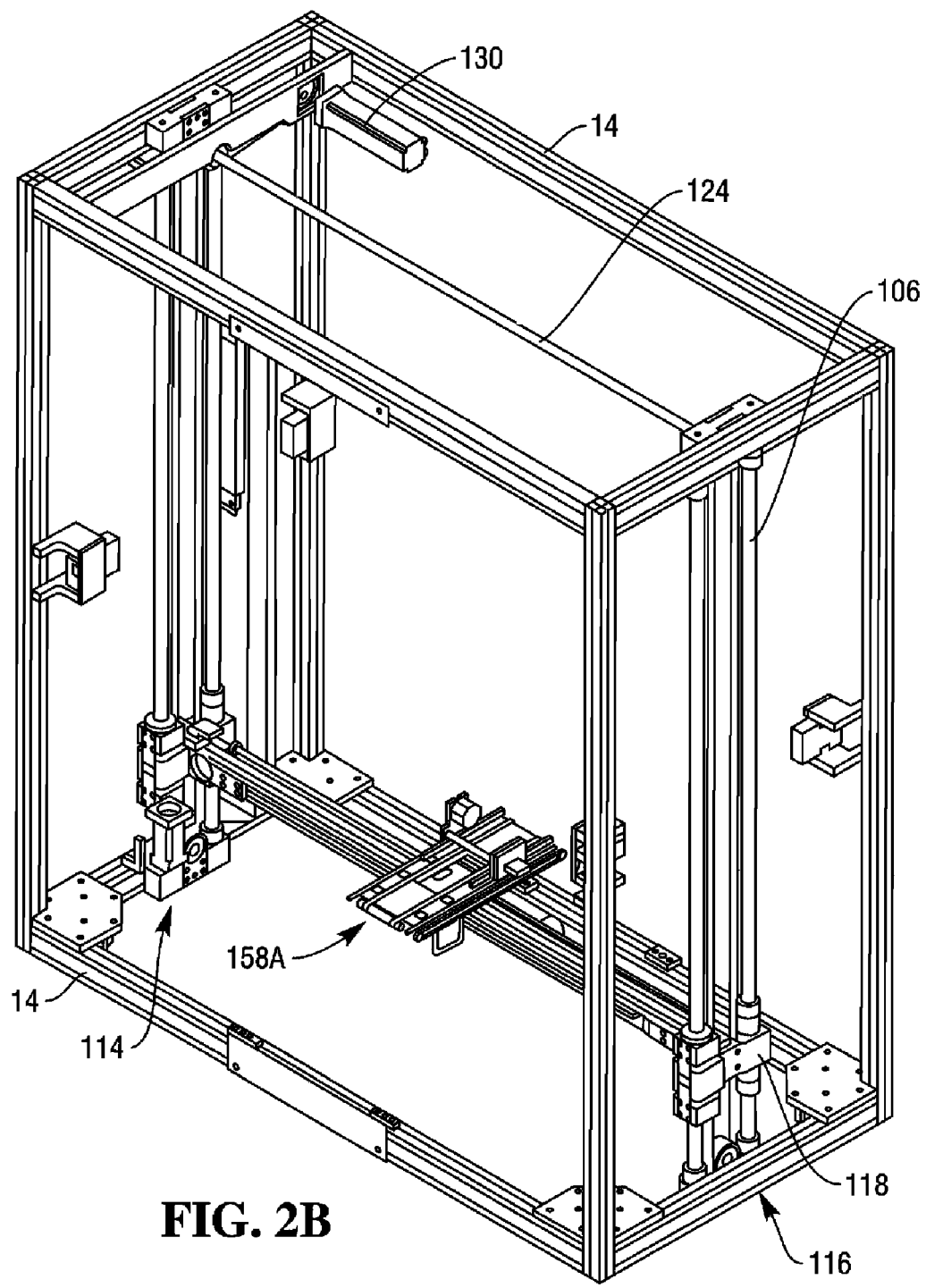
Figure 12:
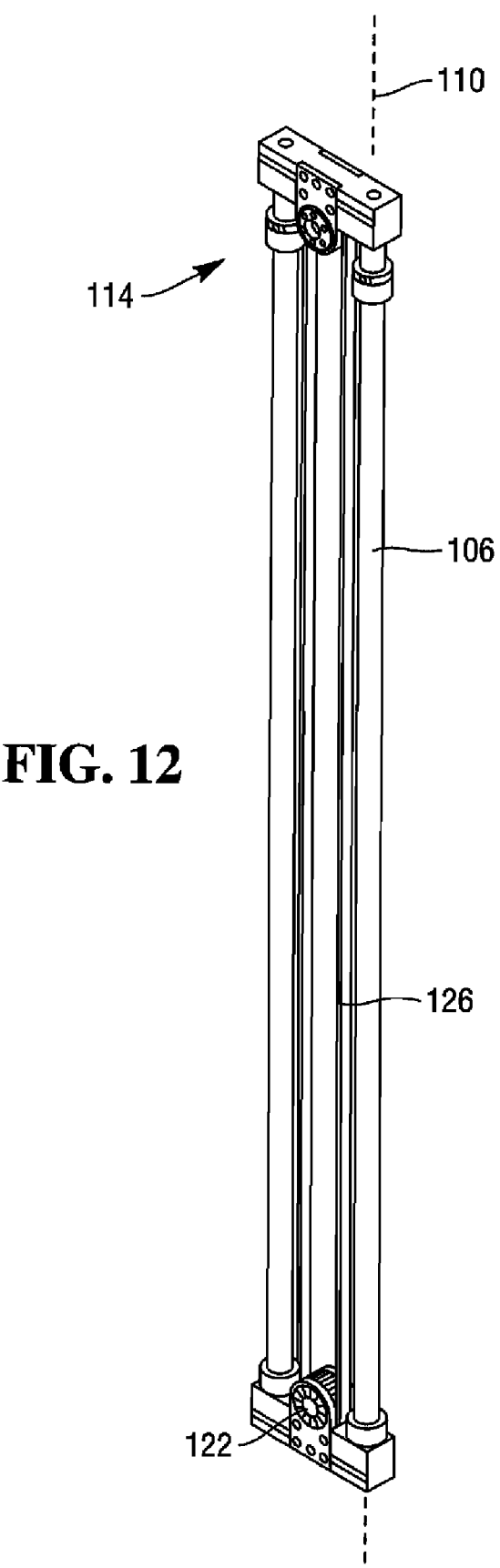
FIG. 12 illustrates a perspective view of an assembly of the retrieval system illustrated in FIGS. 2A and 2B.
Figure 13:
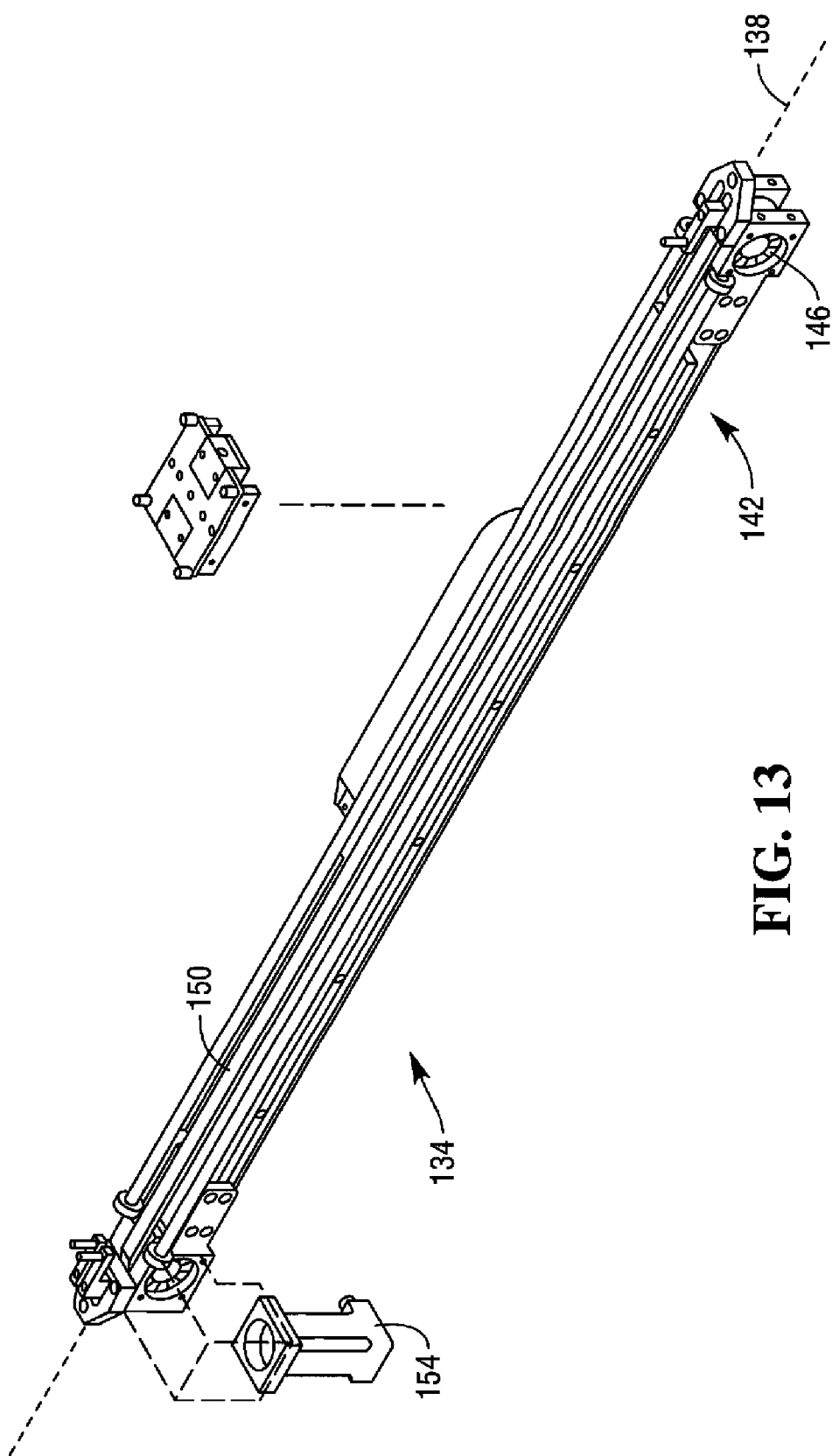
FIG. 13 illustrates a perspective view of an assembly of the retrieval system illustrated in FIGS. 2A and 2B.
Figure 14:
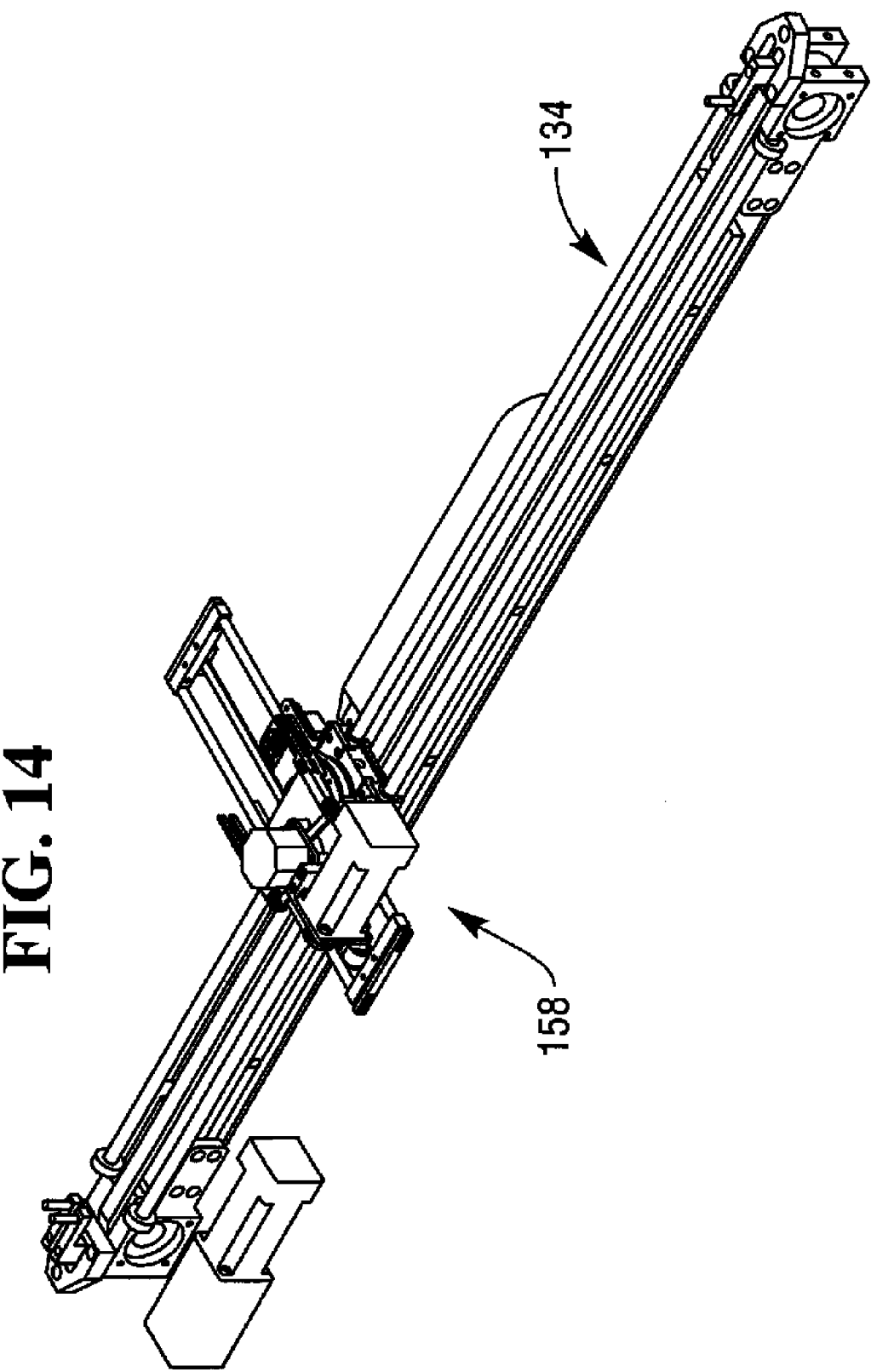
FIG. 14 illustrates a perspective view of an assembly of the retrieval system illustrated in FIG. 2A.

Referring to FIGS. 2A, 2B, and 12, the retrieval system 58 includes a plurality of pairs of guide rails 106 supported by the frame 14. Illustrated in more detail in FIG. 12, the guide rails 106 each include an axis 110 oriented in a generally vertical direction (Y-axis). The pair of guide rails 106 are laterally spaced apart generally along the length of the automated business system 10. One pair of guide rails 106 supports a driven pulley assembly 114 and a carriage assembly 118. The other pair of guide rails 106 supports a passive pulley assembly 116. The driven pulley assembly 114 and the passive pulley assembly 116 each include a plurality of sprockets 122 and a conveyor member, such as a belt 126. The conveyor member can include a magnetic rail, a chain, a cable, a string, a rope, a flexible elongated member, or the like. At least one of the sprockets 122 of the driven pulley assembly 114 and at least one of the sprockets 122 of the passive pulley assembly 116 can be coupled to a link shaft 124 that can provide a common rotation of the sprockets 122. The link shaft 134 is coupled to a servo motor 130, which drives the driven pulley assembly 114. The driven pulley assembly 114 is operable to move a track, such as a linear positioning table 134, in a generally vertical direction.

The retrieval system 58 includes a track, such as a linear positioning table 134, illustrated in FIGS. 2A, 2B, and 13-14 that is supported by the carriage assemblies 118 on each pair of guide rails 106. The linear positioning table 134 includes an axis 138 oriented in a generally horizontal direction (X-axis). The linear positioning table 134 includes a driven pulley assembly 142, which includes a plurality of sprockets 146, a conveyor member, such as a belt 150, and a servo motor 154. The conveyor member can include a magnetic rail, a chain, a cable, a string, a rope, a flexible elongated member, or the like. The driven pulley assembly 142 is operable to move a gripper assembly 158, 158A in a generally horizontal direction.

The linear positioning table 134 can support the gripper assembly 158, 158A, illustrated in FIGS. 14-21. The gripper assembly 158, 158A can traverse the linear positioning table 134 and can move along the length of the automated business system 10 in the horizontal direction. The gripper assembly 158, 158A is operable to move along about 60 percent to about 100 percent of the length of the linear positioning table 134. In another construction, the gripper assembly 158, 158A can move along about 80 percent to about 95 percent of the length of the linear positioning table 134. In another construction, the gripper assembly 158, 158A can move along about 88 percent to about 92 percent of the length of the linear positioning table 134. The linear positioning table 134 can include a proximity sensor that can provide encoder feedback that accurately determines the position of the gripper assembly 158 to ensure that the gripper assembly 158, 158A does not travel beyond the physical limits of the linear positioning table 134. The automated business system 10 can hold more inventory and the gripper assembly 158, 158A can access the inventory as a result of the unique construction of the linear positioning table 134.

Figure 15:
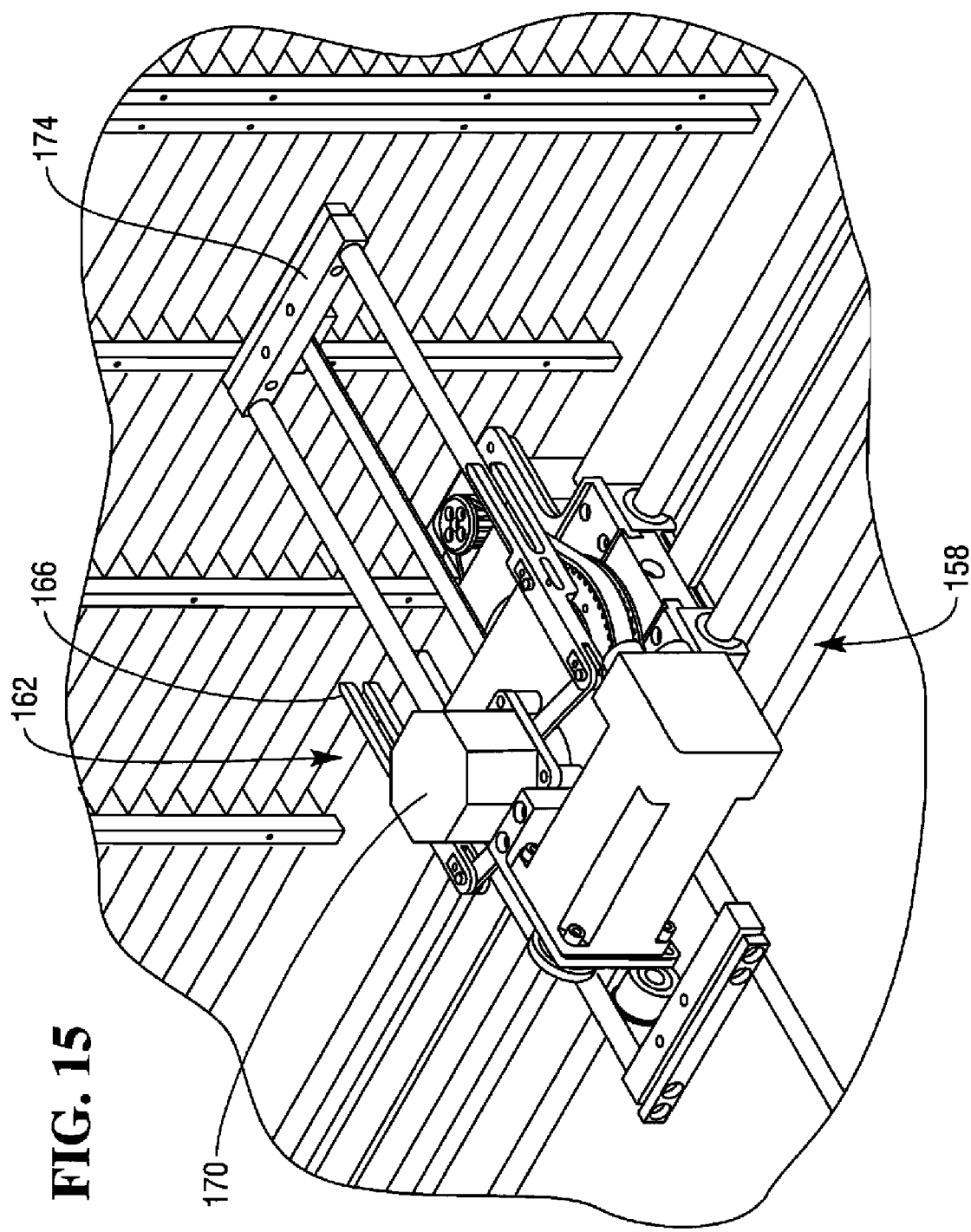
FIG. 15 illustrates a perspective view of an assembly of the retrieval system illustrated in FIG. 2A.
Figure 16:
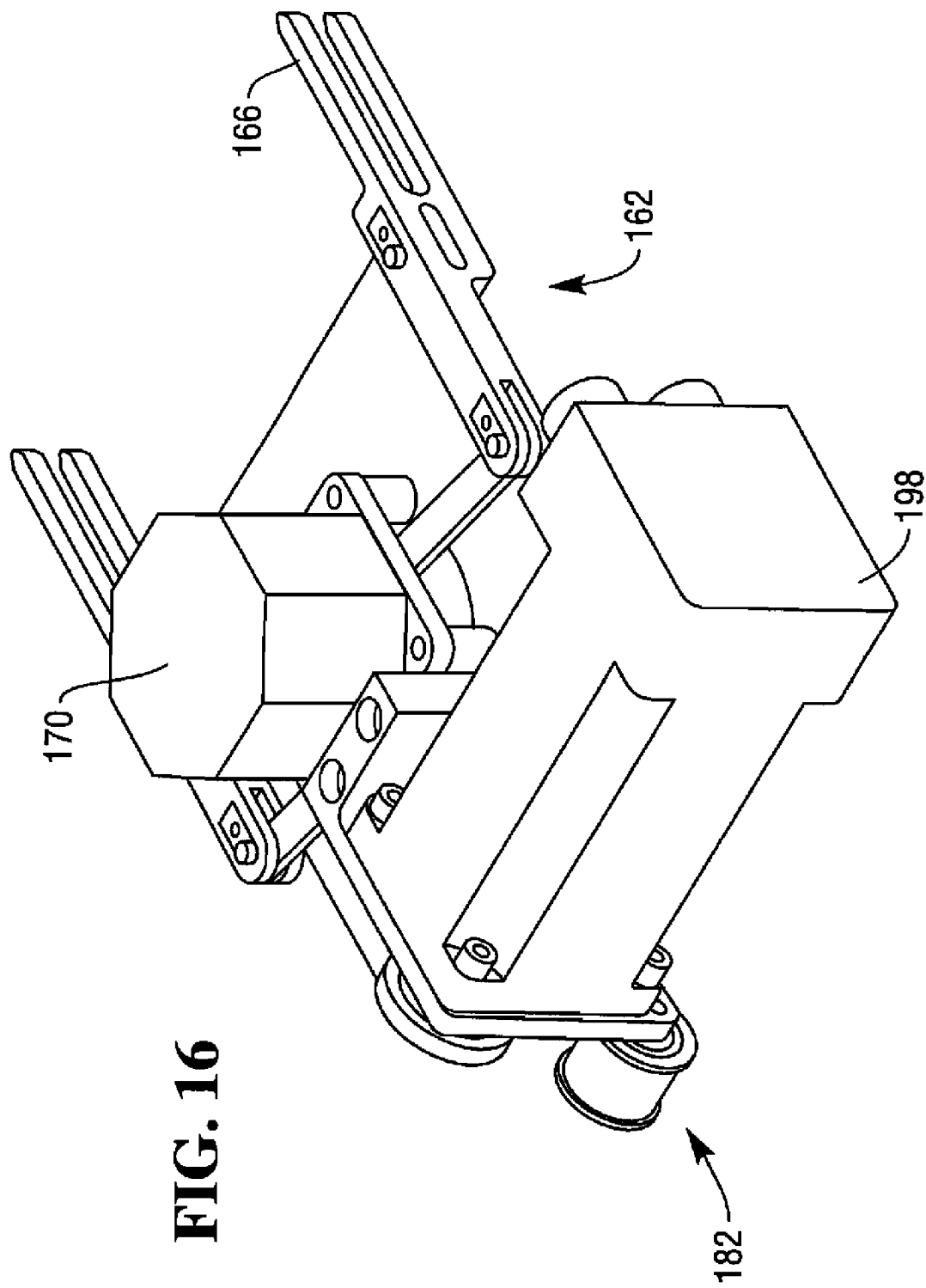
FIG. 16 illustrates a perspective view of an assembly of the retrieval system illustrated in FIG. 2A.

The gripper assembly 158 can include a gripper 162 as illustrated in FIGS. 15-16. The gripper 162 can include a plurality of fingers 166 operable to pivot from a first position to a second position, and all positions in between the first and second positions. The fingers 166 can pivot into the second position to engage the item and to transport the item to the port 46. Each finger 166 is slotted such that when the fingers 166 engage the item, each finger 166 makes contact with a top, a bottom, and a side of the item. The gripper 162 includes a stepper motor 170 operable to control the movement of the fingers 166 from the first position to the second position, and all positions in between the first and second positions. This arrangement of the fingers 166 and method of gripping the item consumes less energy and more securely holds and controls the item while the item is being transported from its storage location to the port 46.

Figure 17:
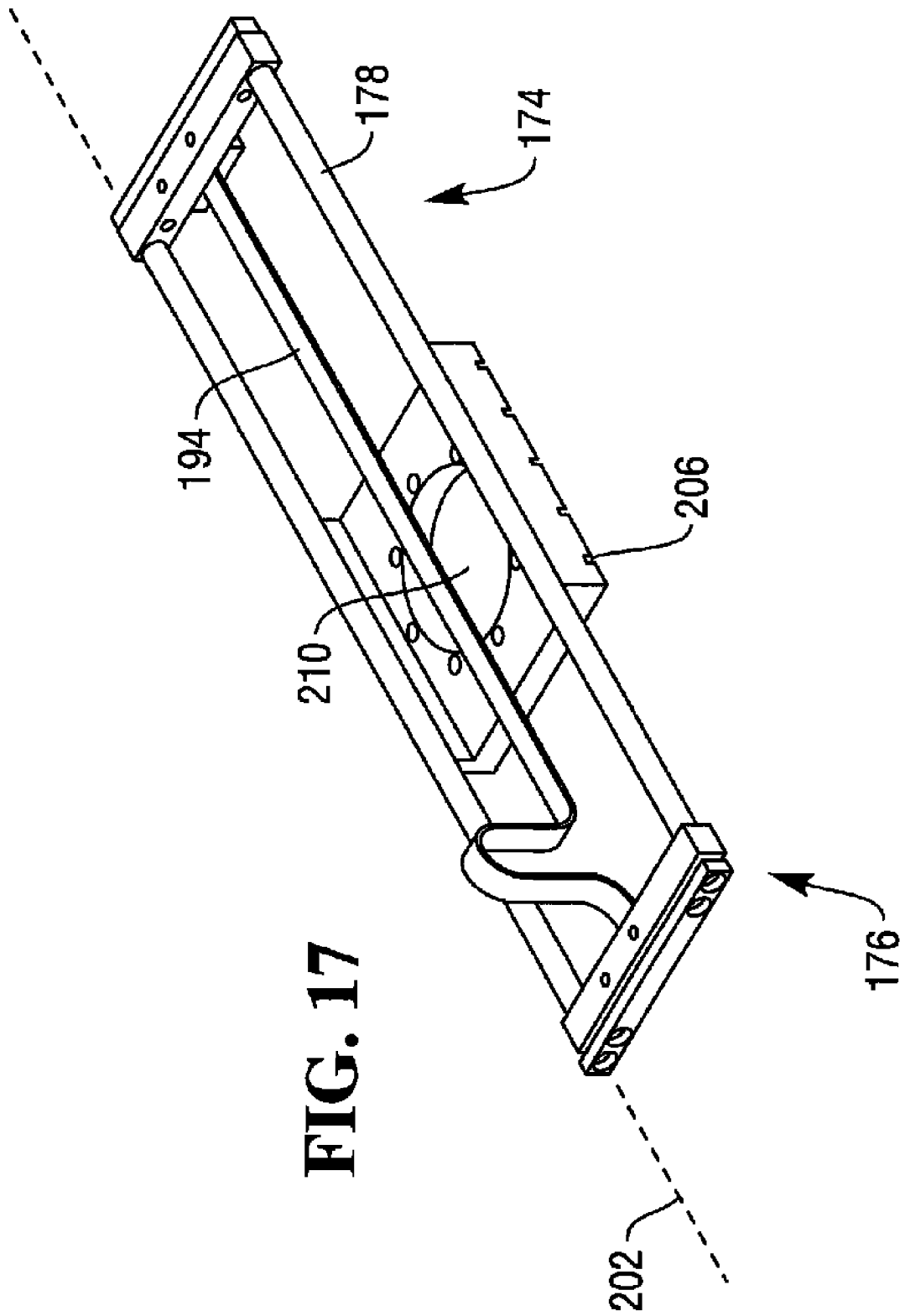
FIG. 17 illustrates a perspective view of an assembly of the retrieval system illustrated in FIG. 2A.
Figure 19:
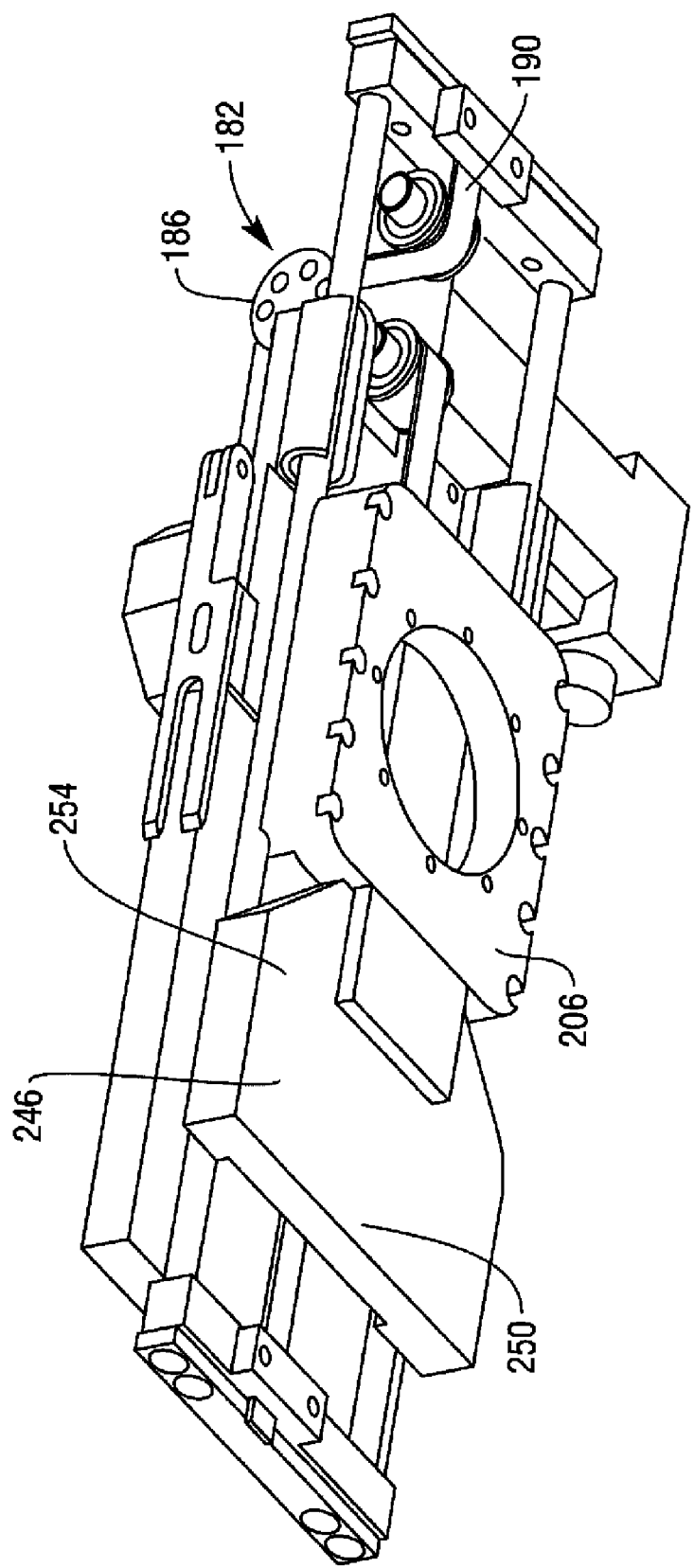
FIG. 19 illustrates a perspective view of an assembly of the retrieval system illustrated in FIG. 2A.

The gripper assembly 158 can include a carriage, such as an extend/retract device 174 as illustrated in FIGS. 15, 17, and 19. The extend/retract device 174 supports the gripper 162. The extend/retract device 174 can include a table 176. The extend/retract device 174 can include a pair of guide rails 178 supported by the table 176. The guide rails 178 can support a driven pulley system 182. The driven pulley system 182 can include a drive pulley 186, a plurality of idler rollers 190, a conveyor member, such as belt 194, and a servo motor 198. The conveyor member can include a magnetic rail, a chain, a cable, a string, a rope, a flexible elongated member, or the like. The guide rails 178 include an axis 202 oriented in a generally horizontal direction (Z axis) and in a generally perpendicular orientation with respect to the linear positioning table axis 138. The driven pulley system 182 is operable to move the gripper 162 from a first position to a second position, and all positions in between the first and second positions. The driven pulley system 182 allows the gripper 162 to move toward and away from the front and back sides of the automated business system 10. The extend/retract device 174 can include a flange 206 having an aperture 210.

Figure 18:
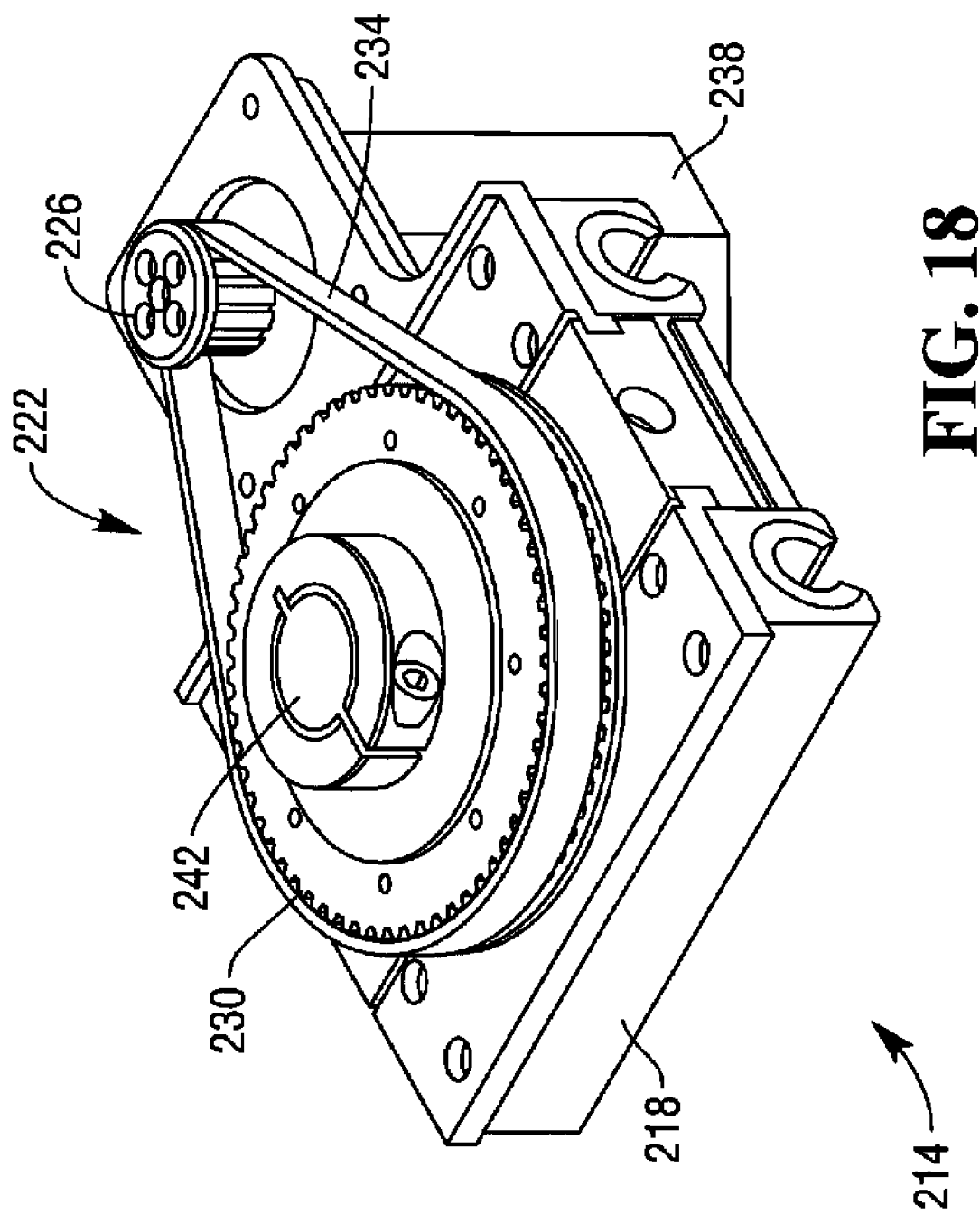
FIG. 18 illustrates a perspective view of an assembly of the retrieval system illustrated in FIG. 2A.

The gripper assembly 158 can include a rotate device 214 as illustrated in FIGS. 15 and 18. The rotate device 214 includes a carriage 218 and a driven pulley system 222. The carriage 218 supports the driven pulley system 222. The driven pulley system 222 includes a drive pulley 226, a sprocket 230, a conveyor member, such as a belt 234, and a stepper motor 238. The conveyor member can include a magnetic rail, a chain, a cable, a string, a rope, a flexible elongated member, or the like. The sprocket 230 includes a shaft 242 operable to receive the flange 206 through the aperture 210 of the extend/retract system 174. The driven pulley system 222 is operable to rotate the gripper clamping system 162 at least 180 degrees in the clockwise and counter clockwise directions. The rotate system 214 can include a deadweight counterbalance to reduce energy consumption and support the gripper assembly 158 while at rest.

The gripper assembly 158 can include a RFID device 246 as illustrated in FIG. 19. The RFID device 246 includes a RFID antenna 250 and RFID reader module 254 supported by the extend/retract device 174. The RFID antenna 250 and RFID reader module 254 can be positioned beneath the guide rails 178 of the extend/retract device 174 and can rotate with the gripper 162 when the rotate device 214 is activated. The RFID device 246 is operable to read a RFID tag located within the item(s) (e.g., the RFID tag is inside the holding case of the disc-based media).

Figure 20:
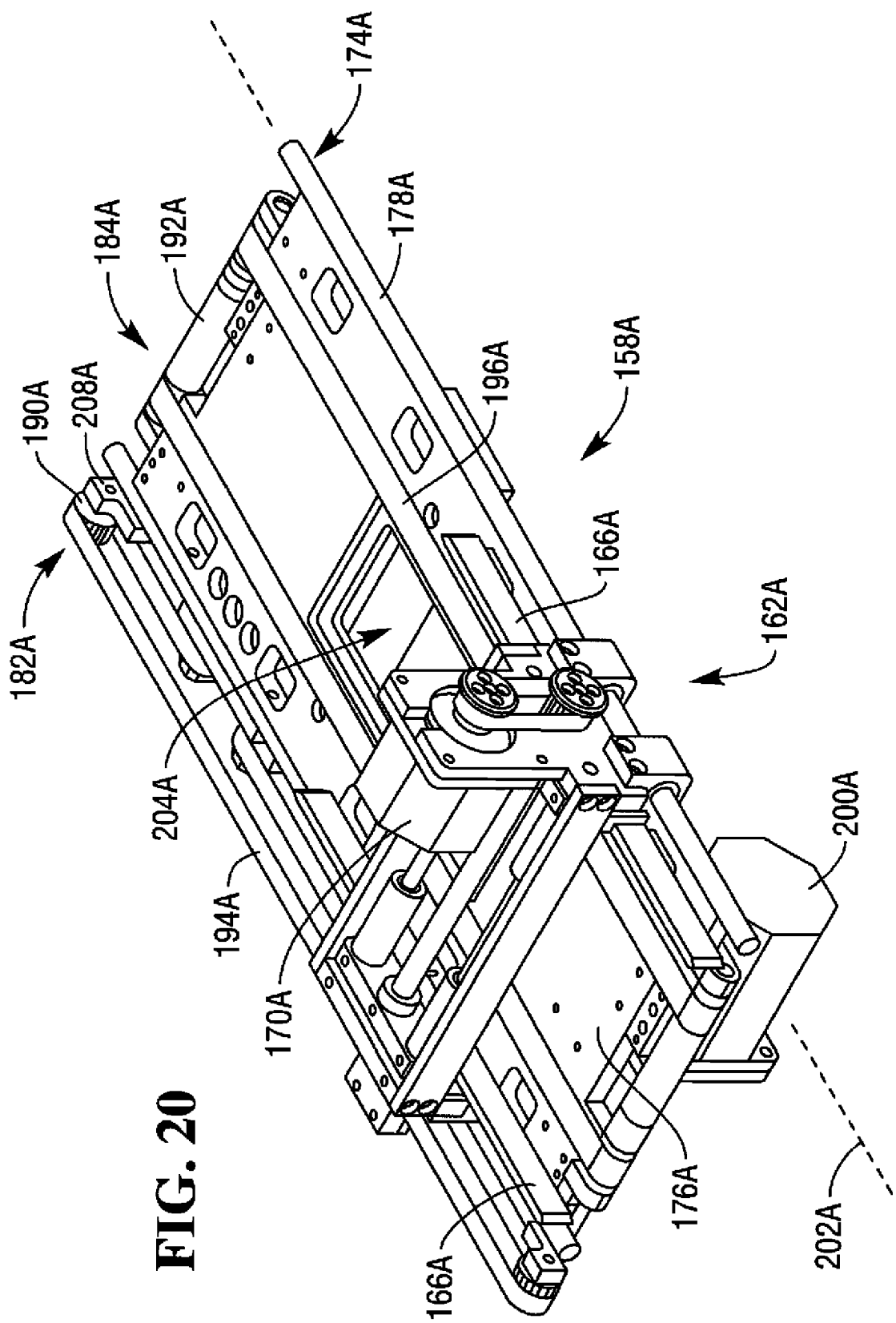
FIG. 20 illustrates a perspective view of an assembly of the retrieval system illustrated in FIG. 2B.
Figure 21:
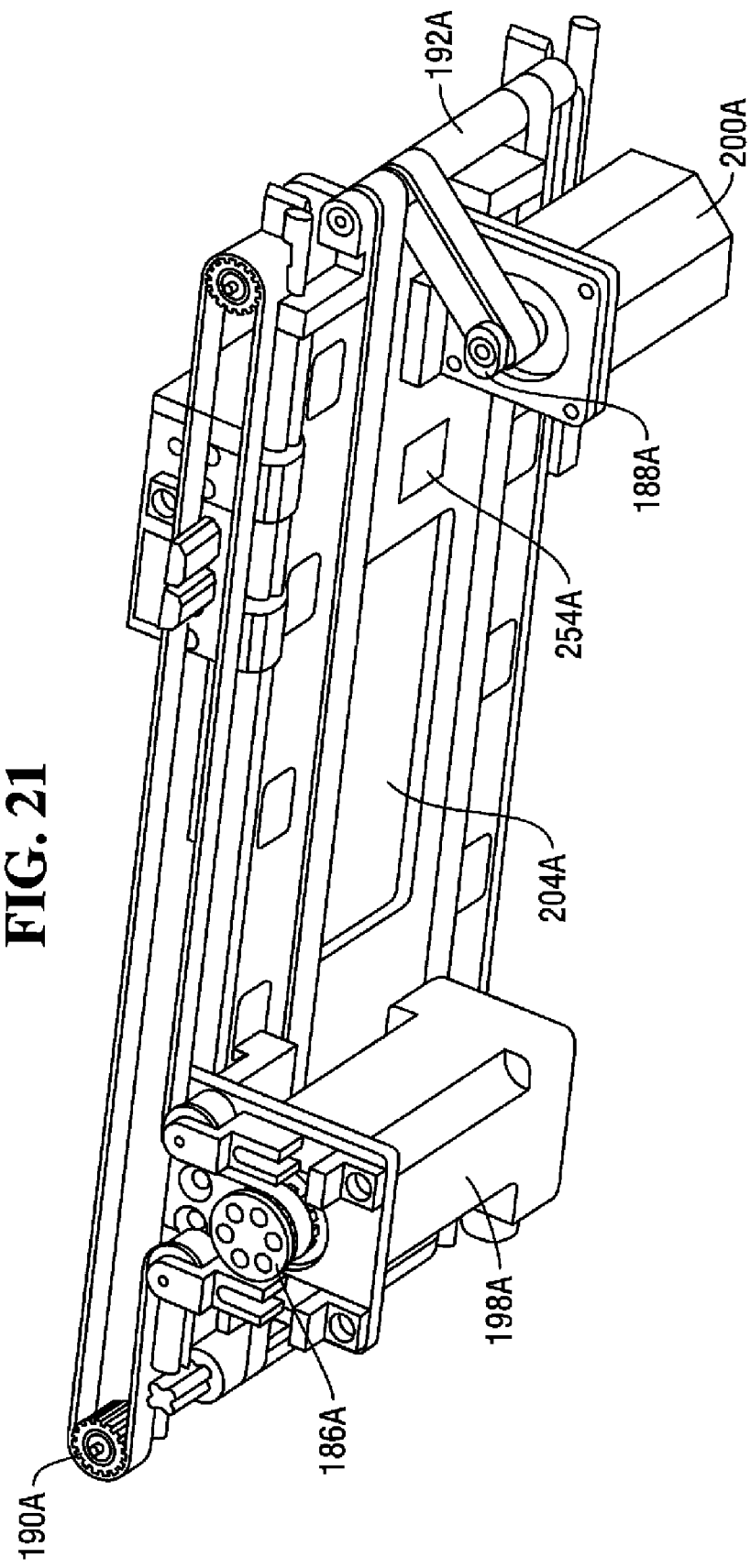
FIG. 21 illustrates a perspective view of an assembly of the retrieval system illustrated in FIG. 2B.

In another embodiment, the retrieval system 58 can include a gripper assembly 158A illustrated in FIGS. 20-21. The gripper assembly 158A can include a gripper 162A. The gripper 162A can include a plurality of fingers 166A operable to move from a first position to a second position, and all positions in between the first and second positions. The fingers 166A can move into the second position to engage the item and to transport the item to a carriage, such as an extend/retract device 174A. The gripper 162A includes a stepper motor 170A operable to control the movement of the fingers 166A from the first position to the second position, and all positions in between the first and second positions. This arrangement of the fingers 166A and method of gripping the item consumes less energy and more securely holds and controls the item while the item is being transported from its storage location to the extend/retract device 174A.

The gripper assembly 158A can include a carriage, such as an extend/retract device 174A as illustrated in FIGS. 20-21. The extend/retract device 174A supports the gripper 162A. The extend/retract device 174A can include a table 176A that supports a pair of guide rails 178A. One of the guide rails 178A can support a driven pulley system 182A. The driven pulley system 182A can include a drive pulley 186A, a plurality of idler rollers 190A, a conveyor member, such as belt 194A, and a servo motor 198A. The conveyor member can include a magnetic rail, a chain, a cable, a string, a rope, a flexible elongated member, or the like. The guide rails 178A include an axis 202A oriented in a generally horizontal direction (Z axis) and in a generally perpendicular orientation with respect to the linear positioning table axis 138. The driven pulley system 182A is operable to move the gripper 162A from a first position to a second position, and all positions in between the first and second positions. The driven pulley system 182A allows the gripper 162A to move toward and away from the front and back sides of the automated business system 10. The table 176A can support a driven pulley system 184A that is operable to move an item from a first position to a second position, and all positions in between the first and second positions. The driven pulley system 184A can include a drive pulley 188A, a plurality of idler rollers 192A, a conveyor member, such as belt 196A, and a servo motor 200A. The conveyor member can include a magnetic rail, a chain, a cable, a string, a rope, a flexible elongated member, or the like. The extend/retract device 174A can include a sensor 208A operable to detect the location of the item while positioned on the table 176A.

The gripper assembly 158A can include a RFID device 246A as illustrated in FIGS. 20-21. The RFID device 246A includes a RFID antenna 250A and RFID reader module 254A supported by the extend/retract device 174A. The table 176A includes an aperture 204A through which the RFID reader module 254A can read the RFID tag on the item. The RFID antenna 250A and RFID reader module 254A can be positioned beneath the guide rails 178A of the extend/retract device 174A. The RFID device 246A is operable to read a RFID tag located within the item(s) (e.g., the RFID tag is inside the holding case of the disc-based media).

The connections between the components and assemblies in the retrieval system 58 are not limited to the manner of assembly described. The components and assemblies can be connected to one another in a different manner and/or could be connected to other components or systems.

The retrieval system 58 includes a multi-axis motion controller 60 supported by the housing 18. The motion controller 60 can communicate with the server 54. The movement commands of the retrieval system 58 can be stored in a motion controller software application 258 ("motion control application 258"). The motion control application 258 can communicate with the POS application 86, which manages the transactional data of the automated business system 10. The motion control application 258 can transmit the movement commands to move the components and assemblies of the retrieval system 58 to retrieve and replace the items. The motion control application 258 can also transmit additional commands to other systems or components in the automated business system 10.

Figure 22:
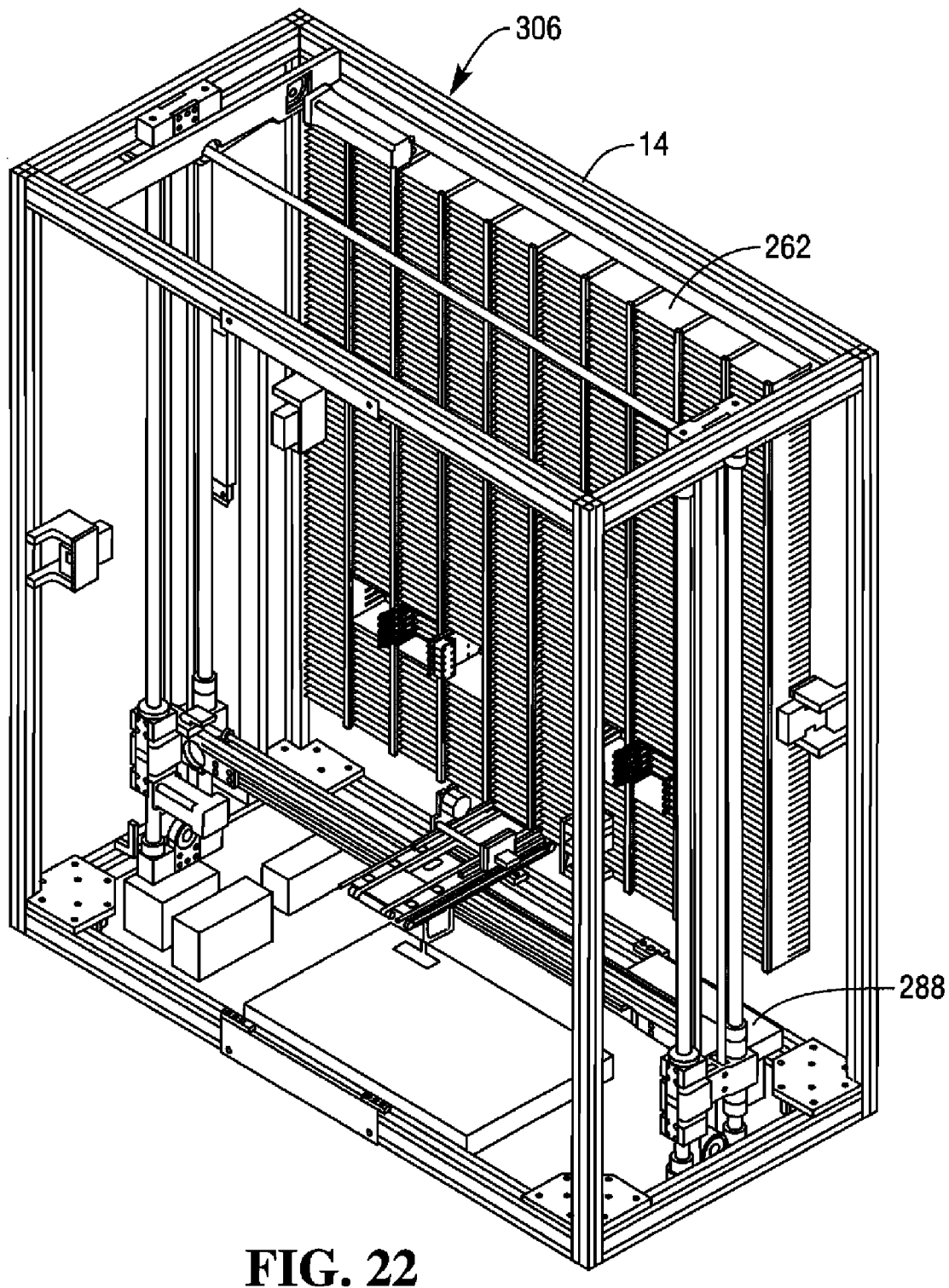
FIG. 22 illustrates a perspective view of a retrieval system of the automated business systems of FIGS. 1A and 1B according to one embodiment of the invention.
Figure 23:
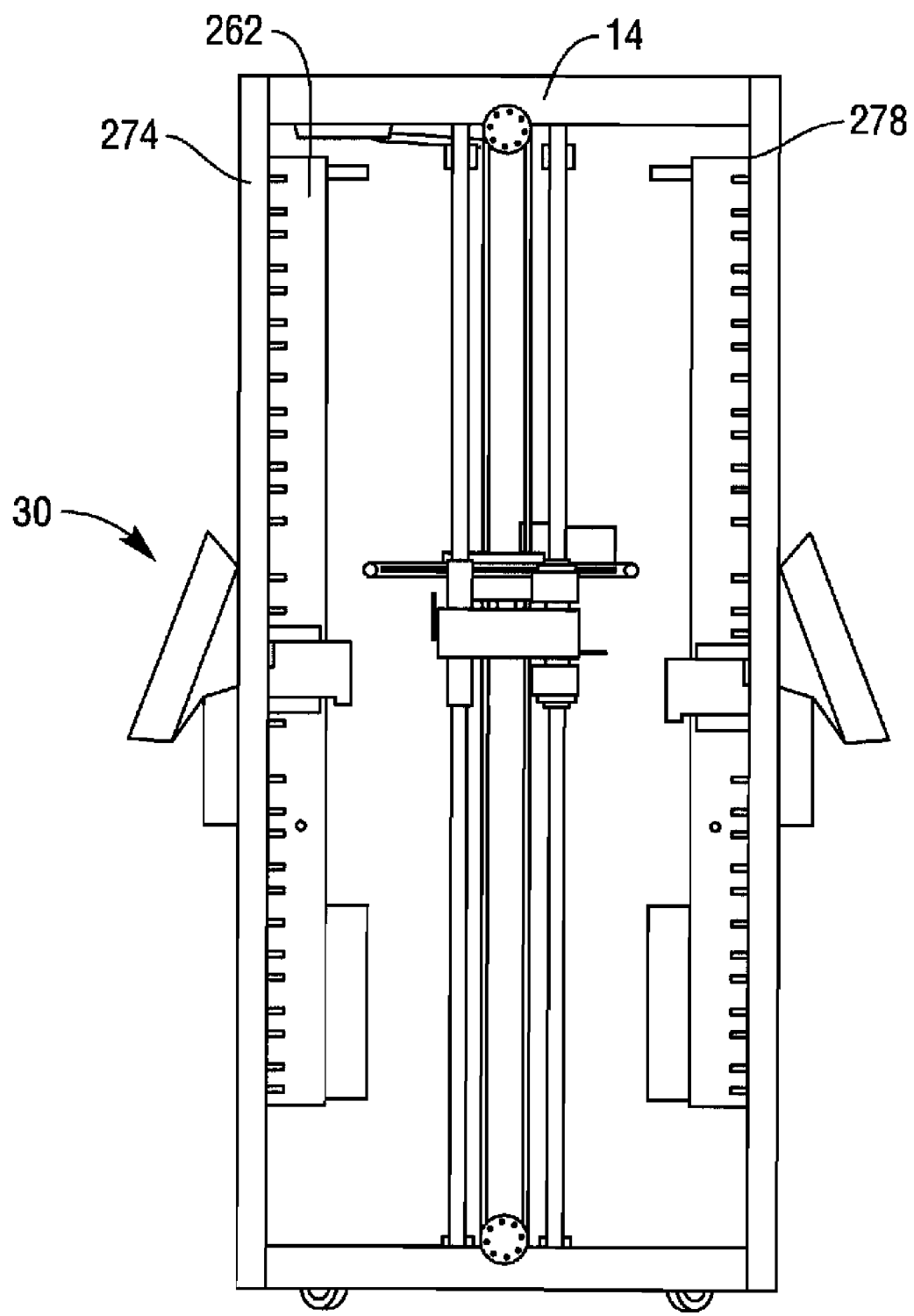
FIG. 23 illustrates a side cross-sectional view of the automated business system of FIGS. 1A and 1B.
Figure 24:
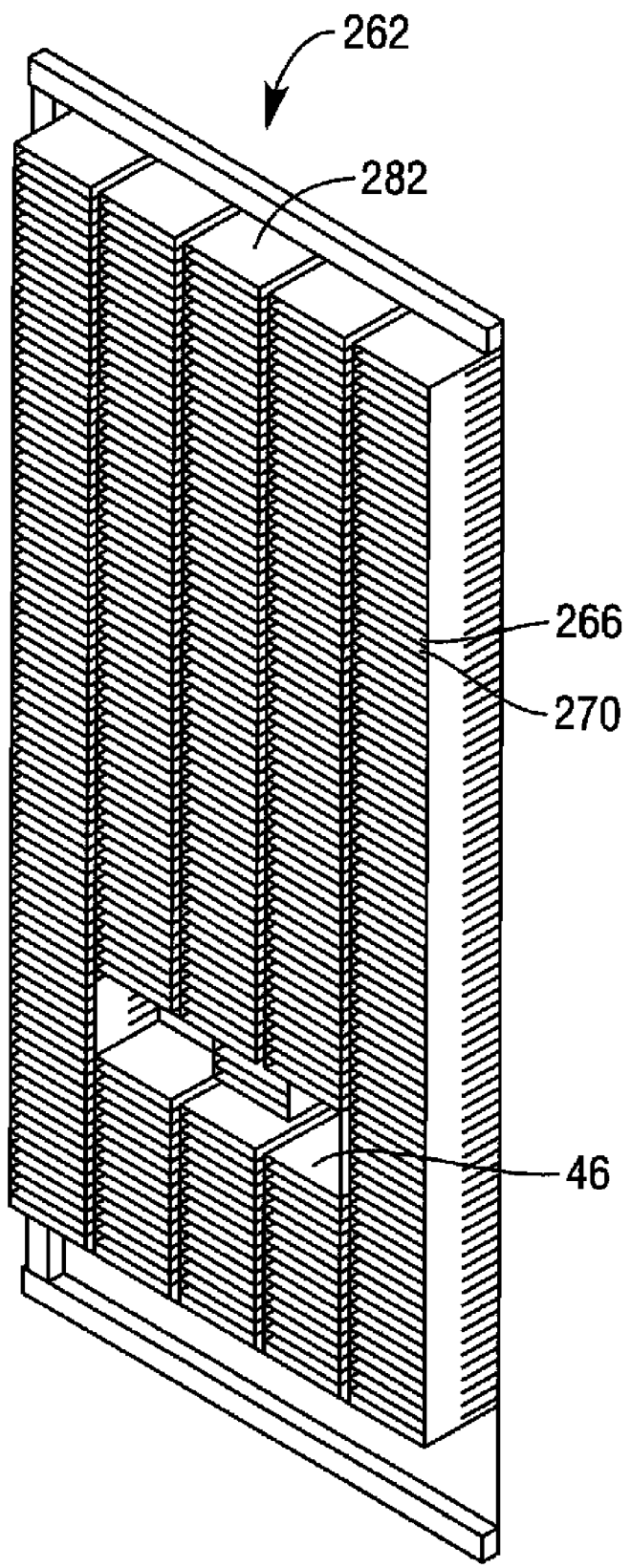
FIG. 24 illustrates a perspective view of an assembly of the automated business systems of FIGS. 1A and 1B.

The motion control application 258 can transmit commands that allow the retrieval system 58 to service any storage bin or input/output position on the front and back face of the automated business system 10. Referring to FIGS. 22-24, the interior of the housing 18 can support a plurality of storage racks 262, which can be specifically designed to accommodate the particular items in the automated business system 10. For example, customized slots or bins 266 can be used to support disc-based media, such as CDs, and DVDs. The bins 270 can include a high friction material 270, such as rubber, resin, synthetic materials, etc. to better secure the disc-based media. The storage racks 262 can be supported on any of the interior surfaces of the housing 18. In one construction of the invention, the storage racks 262 are supported on the interior front surface 274 and the interior rear surface 278 of the automated business system 10. The storage racks 262 include a plurality of storage columns 282, and each storage column 282 is comprised of hundreds of storage bins 266. The storage columns 282 are placed adjacent to one another along the length of the interior front surface 274 and the interior rear surface 278 to maximize internal storage capacity. The storage racks 262 can include gaps between the storage columns 282 to accommodate the ports 46 that service each consumer interaction system 26. The storage racks 262 can have a different configuration than described and illustrated to accommodate any item to be dispensed from the automated business system 10.

Figure 25:
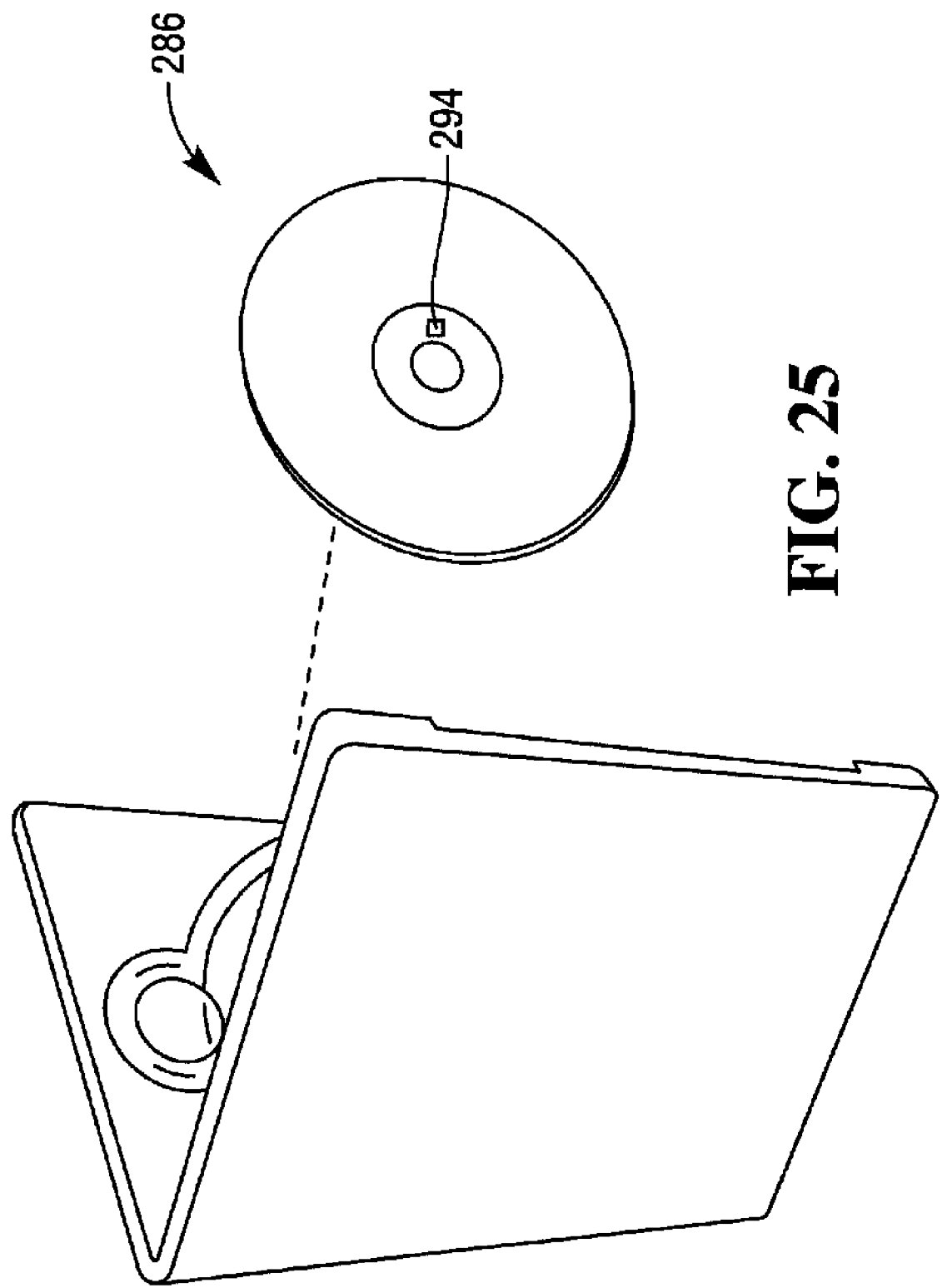
FIG. 25 illustrates a perspective view of an item stored and dispensed from the automated business systems of FIGS. 1A and 1B.

In one embodiment of the invention, the automated business system 10 can store disc-based media 286. Referring to FIG. 25, each disc-based media 286 is placed in a holding case or other storage component, such as a slim jewel box, to protect the disc-based media 286 during transport and storage. The automated business system 10 can accommodate the same sized disc-based media 286 (e.g., CDs and DVDs) or a variety of differently sized disc-based media 286 (e.g., mini discs) based on the size of the holding case.

The automated business system 10 can include a discrete uninterruptible power supply 288 ("UPS"). In the event of a power interruption, the UPS ensures that the retrieval system 58 can conduct a controlled shut down, complete all in-process user transactions, and return the multi-axis motion control system safely to its home position.

The automated business system 10 can include an identification and tracking system 278 that utilizes RFID technology. The identification and tracking system 290 includes a RFID tag 294 attached to each item. For example, the RFID tag 294 can be attached to the CD and the DVD rather than the holding case (illustrated in FIG. 25). The identification and tracking system 290 also includes a tracking software application 298 that can communicate with the RFID system 246, 246A (described above). The tracking software application 298 can reside on the server 54 (illustrated in FIG. 3) and can identify the location and status of each item. The automated business system 10 is not limited to RFID technology, but may include any wireless communication system to identify and track an item.

Referring to FIG. 26, the identification and tracking system 290 includes an interrogator or powered antenna 302 and a plurality of sensors 304. The sensors 304 can be positioned in each slot of the five-slot array of the port 46. When an item is inserted into one of the slots of the port 46, the sensor 304 of the respective slot can sense the presence of an item. The sensor 304 can transmit a signal to the motion control application 258, which can transmit a command to the retrieval system 58 to retrieve the item. The gripper assembly 158, 158A can retrieve the item, position the item on the table 176, 176A, and read the identifying information stored on the RFID tag 294 on the item. This identifying information is then associated with a transaction stored in the database 82. The transaction can be the introduction of a new item or the return of an existing item. The POS application 86 then instructs the retrieval system 58 to store the item in a prescribed storage bin 266 in the storage rack 262. If the RFID information read during this process cannot be reconciled with the database 82, the gripper assembly 158, 158A is instructed to return the unrecognized item to the same port 46 from which the item was retrieved. In another construction, the gripper assembly 158, 158A may be instructed to store the unrecognized item in a prescribed storage bin 266 for later administrative review.

The interrogator 302 is comprised of an antenna and is an integral component of the gripper assembly 158, 158A. This configuration enables the interrogator 302 to read all items inserted into any slot of the port 46. This configuration also enables the automated business system 10 to validate the identity of all items upon dispensing the inventory as a secondary assurance that the correct item is being dispensed to the user. This configuration also enables the automated business system 10 to take a complete physical inventory at any time or programmed interval desired by the owner or system administrator. An anti-collision algorithm built into the antenna software ensures that each item is only read once.

The integrated chip used on the RFID tag 294 possesses 1,024 bytes of read/write memory. Less than 200 bytes of this read/write memory are consumed by the unique alphanumeric identifier recorded to the chip during its manufacture. This unique identifier cannot be overwritten. The interrogator 302 has the capability to transmit data to the RFID tag 294 where the data can be stored. By virtue of the RFID chip's read/write memory capacity and the fact that the chip resides on the RFID tag 294, which is mounted directly on the disc torus or other location of the item, the automated business system 10 can record the entire transaction history of each disc-based media or item directly onto the disc itself pr into a storage memory component. The interrogator 302 has the capability of reading all 1,024 bytes of information stored on the RFID chip.

The RFID tagging approach is not a line of site technology. As a result, the RFID tag is readable regardless of how the holding case or item is inserted into the port 46.

The automated business system 10, according to one construction of the invention, utilizes a circular form factor 13.56 megahertz RFID tag 294 that uniquely identifies each disc-based media or item. The RFID tag 294 is applied to the torus or other location of each disc-based media or other location on a non-disc-based media item prior to being inserted into the automated business system 10. The RFID tag 294 includes an integrated chip, which is uniquely identified during its manufacture. Since the manufacturer of the chip adheres to international standards, the disc identification is unique unto the universe of all chips of this nature.

In one embodiment of the invention, an automated business system 500 can generate disc-based media on demand. For example, the user can request rental and/or purchase of a particular movie, music or game title, and the automated business system 500 can generate a new DVD or CD by writing a movie file, a music file or a game title to the DVD or CD, respectively. For example, if the user requests rental and/or purchase of particular movie, music or game title, and the particular movie or music title is not available at that time, the automated business system 500 can automatically generate the movie, music title or game title by writing a movie file, a music file or a game file to a DVD or CD, respectively.

Figure 27:
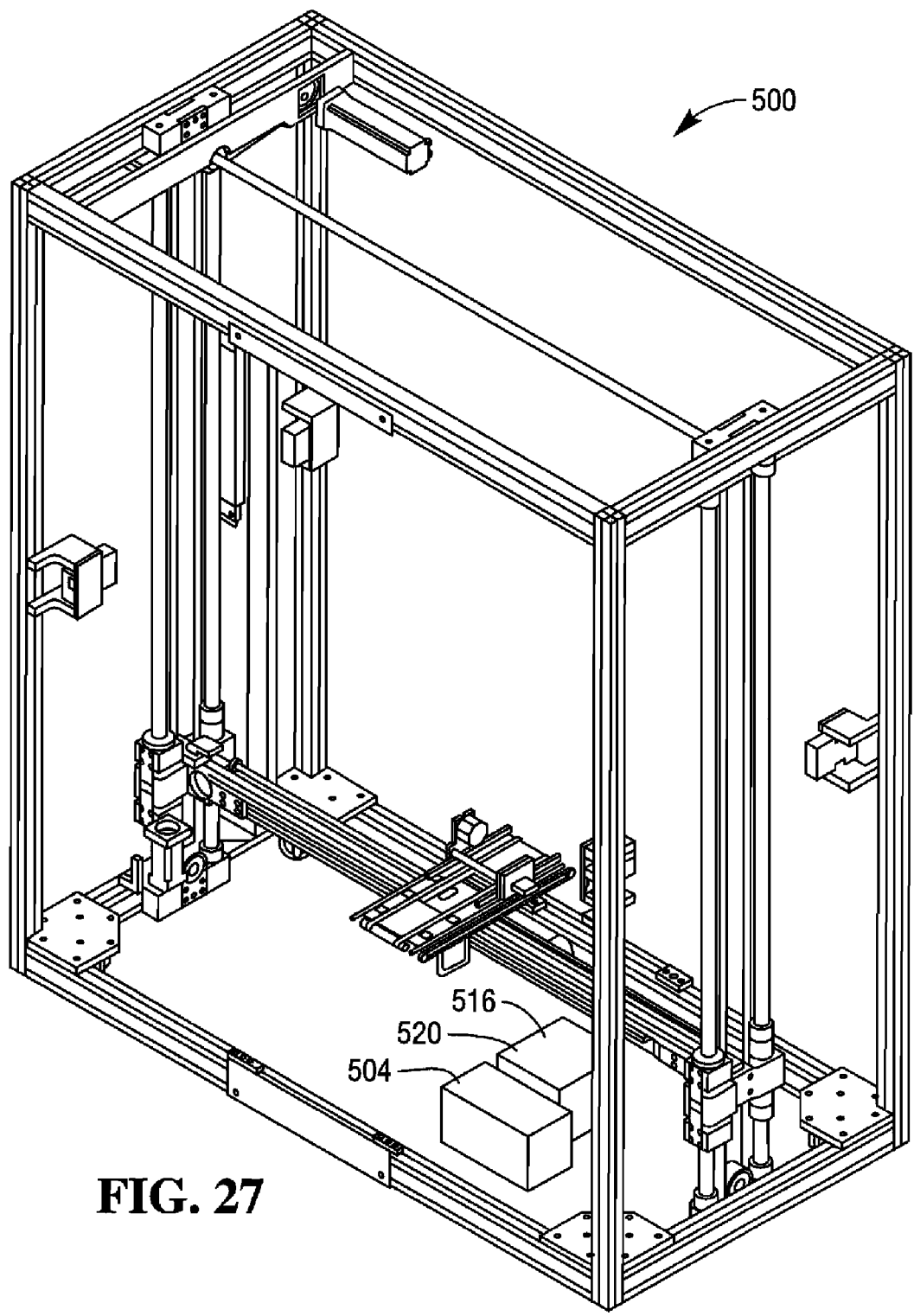
FIG. 27 illustrates a perspective view of an automated business system according to one embodiment of the invention.

The automated business system 500 illustrated in FIG. 27, according to one embodiment of the invention, can include a plurality of blank discs 504 and holding cases for the blank discs 504 in addition to the components and systems described above for the automated business system 10. The database 82 can include a plurality of movie files 508, a plurality of music files 512, and a plurality of game files 514. The movie files 508, the music files 512, and the game files 514 can be stored in the database 82 in a compressed format (e.g., MPEG-2 format or any other advanced MPEG format) or in an uncompressed format. The automated business system 500 can include a disc-based media writer 516 operable to write or record the movie files 508, the music files 512, and the game files 514 onto a blank disc 504. The automated business system 500 can include a MPEG-2 encoder 520 (or any other advanced MPEG format or other compressible format encoder) operable to compress the movie files 508, the music files 512, and the game files 514 if stored in the database 82 in an uncompressed format, prior to being transmitted to the disc-based media writer 516.

Figure 28:
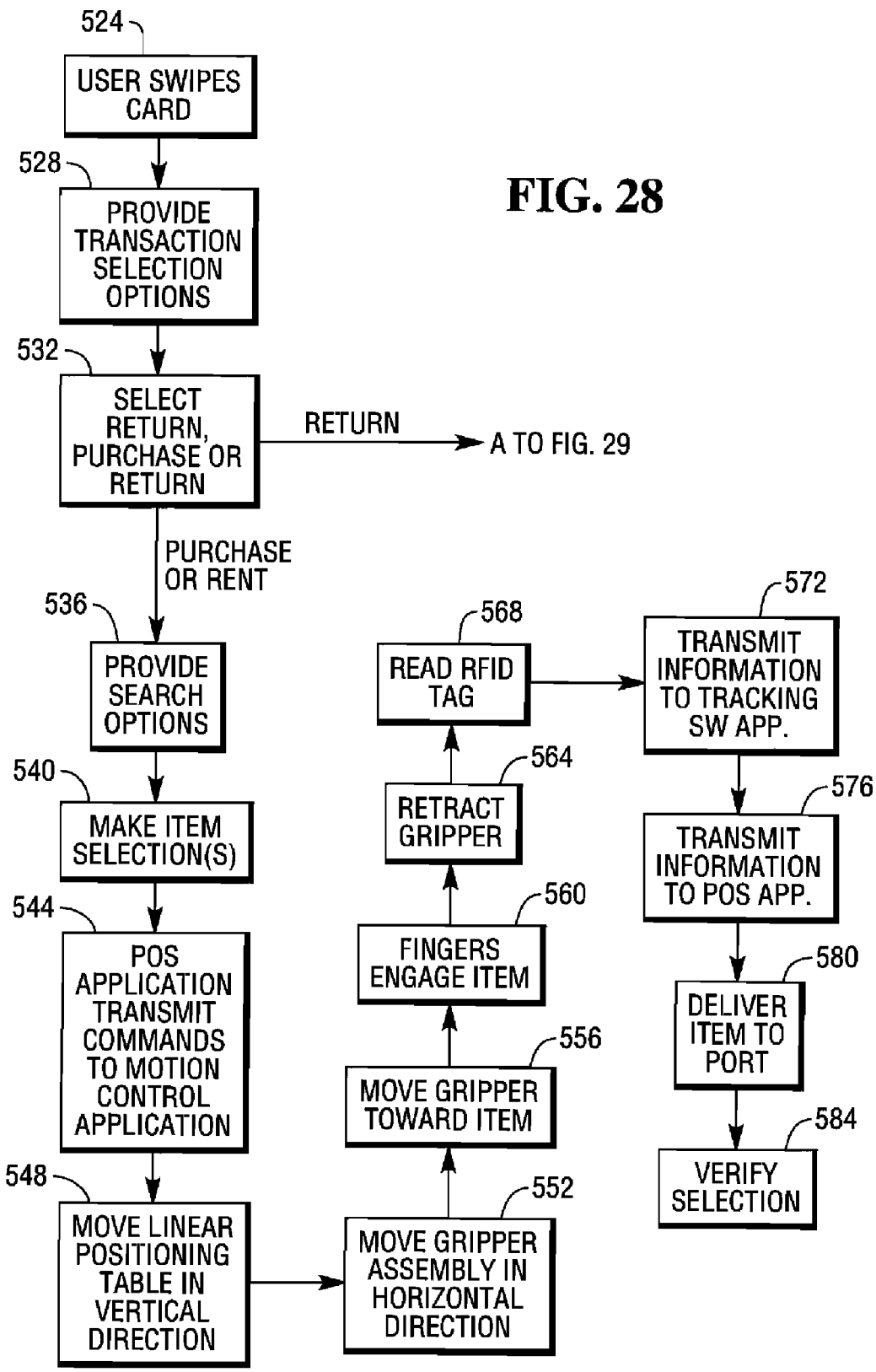
FIG. 28 is a flow chart illustrating operation of the automated business systems of FIGS. 1A and 1B according to one embodiment of the invention.

FIG. 28 is a flow chart illustrating one embodiment of the method of the invention. The user can swipe (at 524) a card through the card reader 34 at the consumer interaction system 26 to interact with the automated business system 500. It should be noted that the user can swipe a card through the card reader 34 at any time during the process. The user does not need to swipe a card through the card reader 34 to begin the process. The graphical user interface 94 can provide (at 528) selection options on the display 30 for the type of transaction to be performed with the automated business system 500. The user can select (at 532) 'Rent', 'Purchase' or 'Return' from display screen 98A illustrated in FIG. 8A or 'Movies' or 'Games' from display screen 98B illustrated in FIG. 8B. If the user selects 'Rent' or 'Purchase' from display screen 98A or 'Movies' or 'Games' from display screen 98B, the graphical user interface 94 can provide (at 536) search options on the display 30 to search the items in the database 82 of the automated business system 500. The user can make (at 540) a selection of one or more items to rent or purchase. Based on the selection(s), the POS application 86 can transmit (at 544) commands to the motion control application 258, which can instruct the retrieval system 58 to locate the disc-based media selection(s) in the storage rack 262. The linear positioning table 134 of the retrieval system 58 can move (at 548) along the guide rails 106 in the vertical direction (Y axis) to the row of the storage rack 262 in which one of the disc-based media selections is located. Next, the gripper assembly 158, 158A can move (at 552) along the linear positioning table. 134 in the horizontal direction (X-axis) to the storage column 282 of the storage rack 262 in which the disc-based media selection is located. The gripper. 162, 162A can move (at 556) along (Z-axis) the guide rails 178, 178A of the extend/retract device 174, 174A to get closer to the disc-based media selection. The fingers 166, 166A of the gripper 162, 162A can engage (at 560) the disc-based media selection and the gripper 162, 162A can retract (at 564) along the guide rails 178, 178A. The RFID antenna 250 and RFID reader module 254 can read (at 568) the RFID tag 294 on the disc-based media 286 selection. The RFID reader module 254 can transmit (at 572) the information read from the RFID tag 294 to the tracking software application 298 where the information can be stored. The tracking software application 298 can transmit (at 576) the information to the POS application 86. The gripper assembly 158, 158A can deliver (at 580) the disc-based media selection to the port 46 where the disc-based media selection is inserted into one of the slots. During the course of this movement, the interrogator 302 can read (at 584) the RFID tag 294 to verify that the disc-based media is the item that was selected. The user can be charged for the purchase of the item at any time after the selection has been made. The user can be charge for the rental of the item at any time after the selection has been made and/or upon return of the item.

Figure 29:
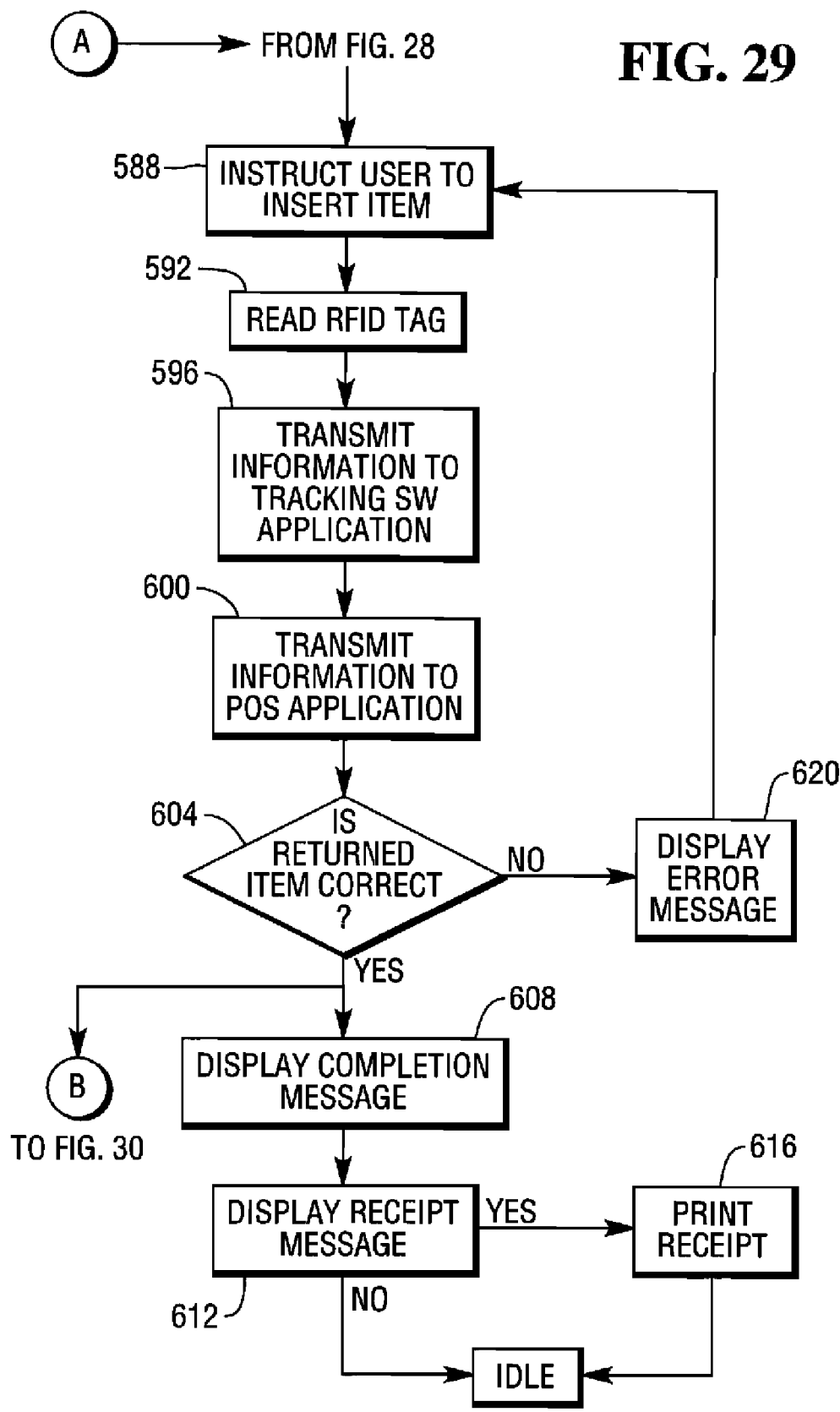
FIG. 29 is a flow chart illustrating operation of the automated business systems of FIGS. 1A and 1B according to one embodiment of the invention.
Figure 30:
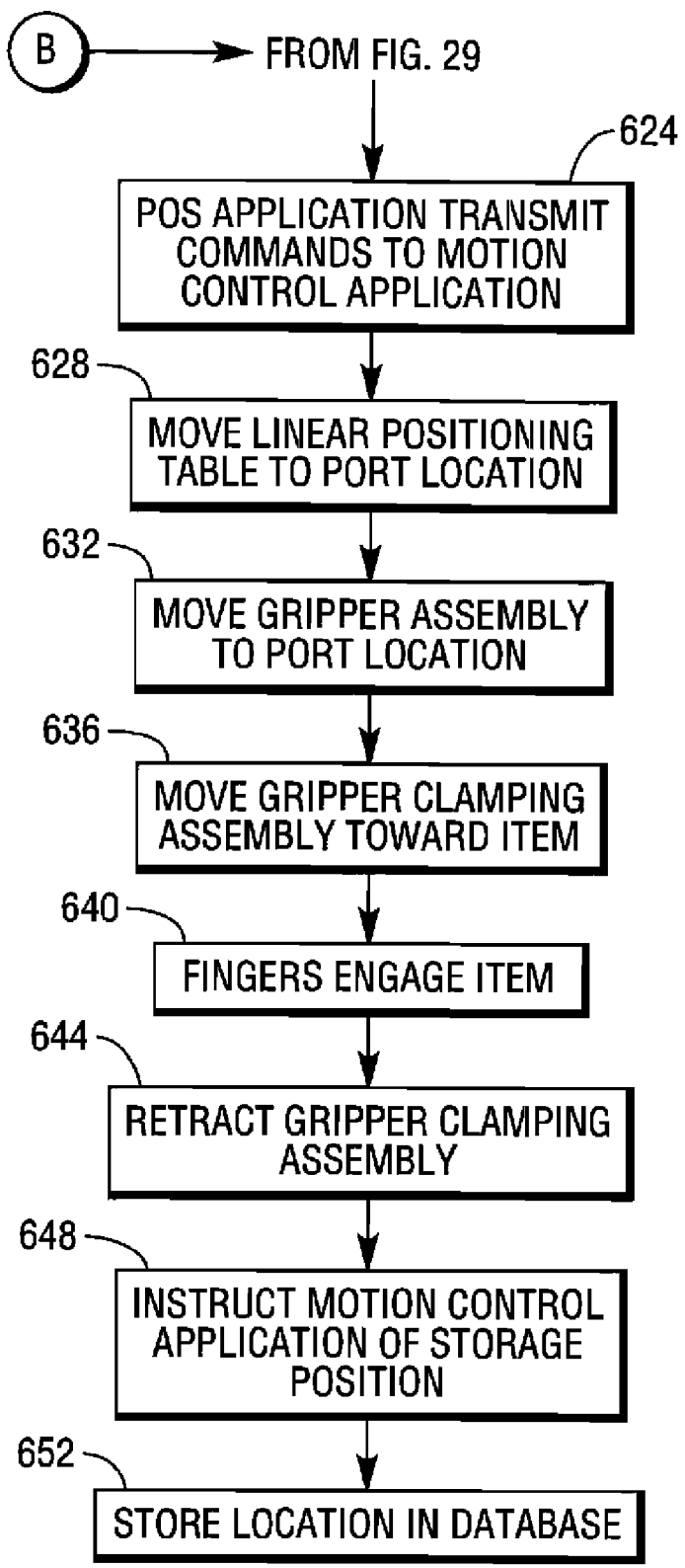
FIG. 30 is a flow chart illustrating operation of the automated business systems of FIGS. 1A and 1B according to one embodiment of the invention.

Referring to FIGS. 29-30, if the user selected 'Return' on display screen 98A at act 532, the graphical user interface 94 can instruct (at 588) the user to insert the disc-based media in the port 46. The interrogator 302 can read (at 592) the RFID tag 294 on the item to identify the disc-based media The interrogator 302 can transmit (at 596) the identification information to the tracking software application 298 to associate the return with the rental transaction. The tracking software application 298 can transmit (at 600) the information to the POS application 86. The POS application 86 can determine (at 604) if the correct disc-based media item is being returned. If the correct disc-based media was inserted in the port 46, the POS application can transmit (at 608) a completion-type of message to the graphical user interface 94 to display on the display 30. The graphical user interface 94 can display (at 612) an option of whether the user would like a receipt. If the user selects 'Yes', the POS application 86 can transmit (at 616) a command to the printer 42 to print a receipt.

If the incorrect disc-based media is inserted in the port 46, the POS application 86 can transmit (at 620) an error-type of message and a 'Help' option to the graphical user interface 94 to display on the display 30. At this point, the user can retrieve the disc-based media from the port 46 and verify that the correct disc is being returned and can reinsert the disc-based media in the port 46. Acts 588-620 are repeated, as necessary. The user can select the 'Help' option on the display 30 for assistance.

Referring to FIG. 30, if the correct disc-based media is inserted in the port 46, the POS application 86 can transmit (at 624) a command to the motion control application 258, which can instruct the retrieval system 58 to retrieve the disc-based media from the port 46. The linear positioning table 134 of the retrieval system 58 can move (at 628) along the guide rails 106 in the vertical direction (Y axis) to the location of the port 46 where the returned disc-based media is located. Next, the gripper assembly 158, 158A can move (at 632) along the linear positioning table 134 in the horizontal direction (X-axis) to the location of the port 46 where the returned disc-based media is located. The gripper 162, 162A can move (at 636) along (Z-axis) the guide rails 178, 178A of the extend/retract device 174, 174A to get closer to the disc-based media. The fingers 166, 166A of the gripper 162, 162A can engage (at 640) the disc-based media and the gripper 162, 162A can retract (at 644) along the guide rails 178, 178A. The POS application 86 can instruct (at 648) the motion control application 258 to position the disc-based media in a particular bin 266 of the storage rack 262. The POS application 86 can store (at 652) the location of the disc-based media in the database 82. The user can be charged for the rental of the item at any time after the selection has been made and/or upon return of the item.

Figure 31:
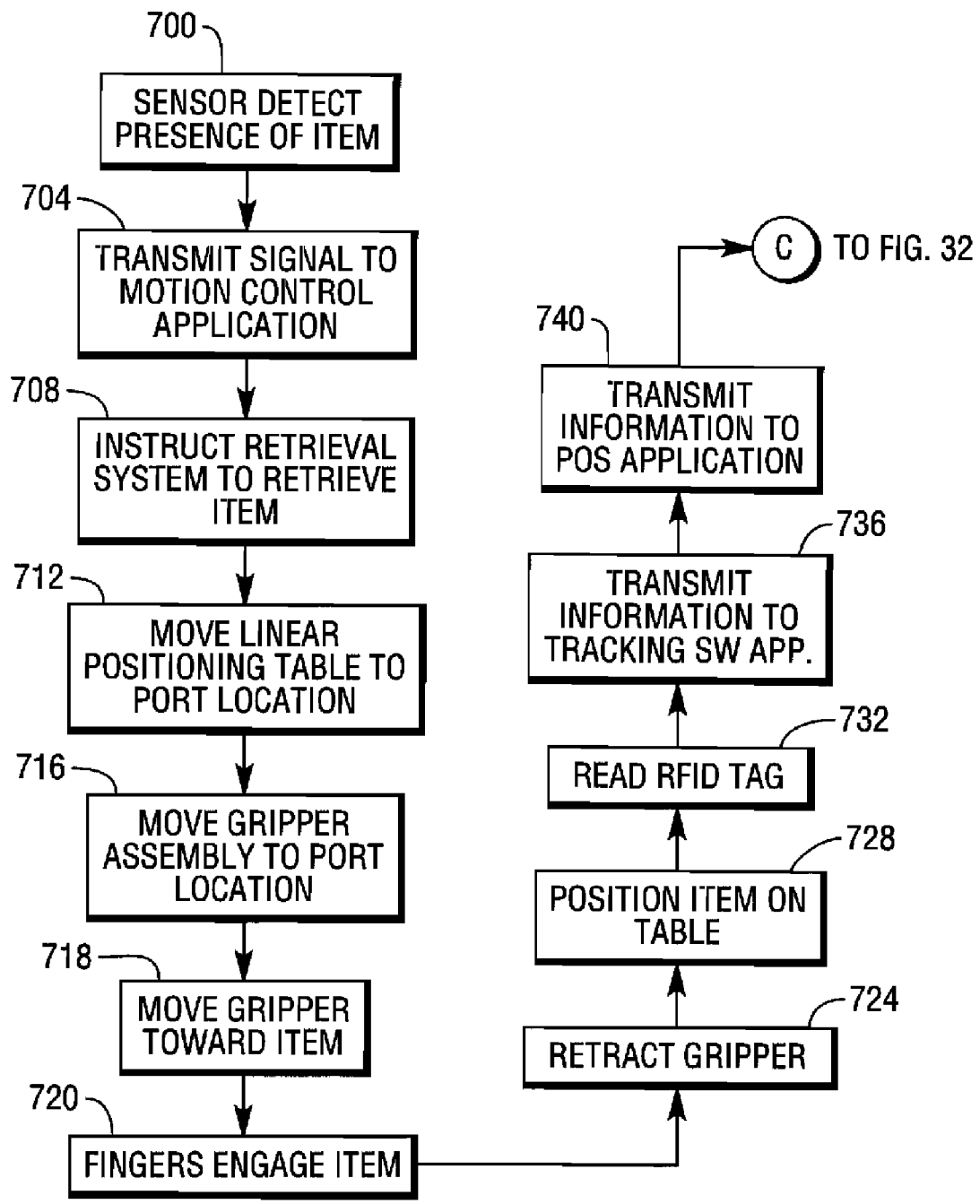
FIG. 31 is a flow chart illustrating operation of the automated business systems of FIGS. 1A and 1B according to one embodiment of the invention.
Figure 32:
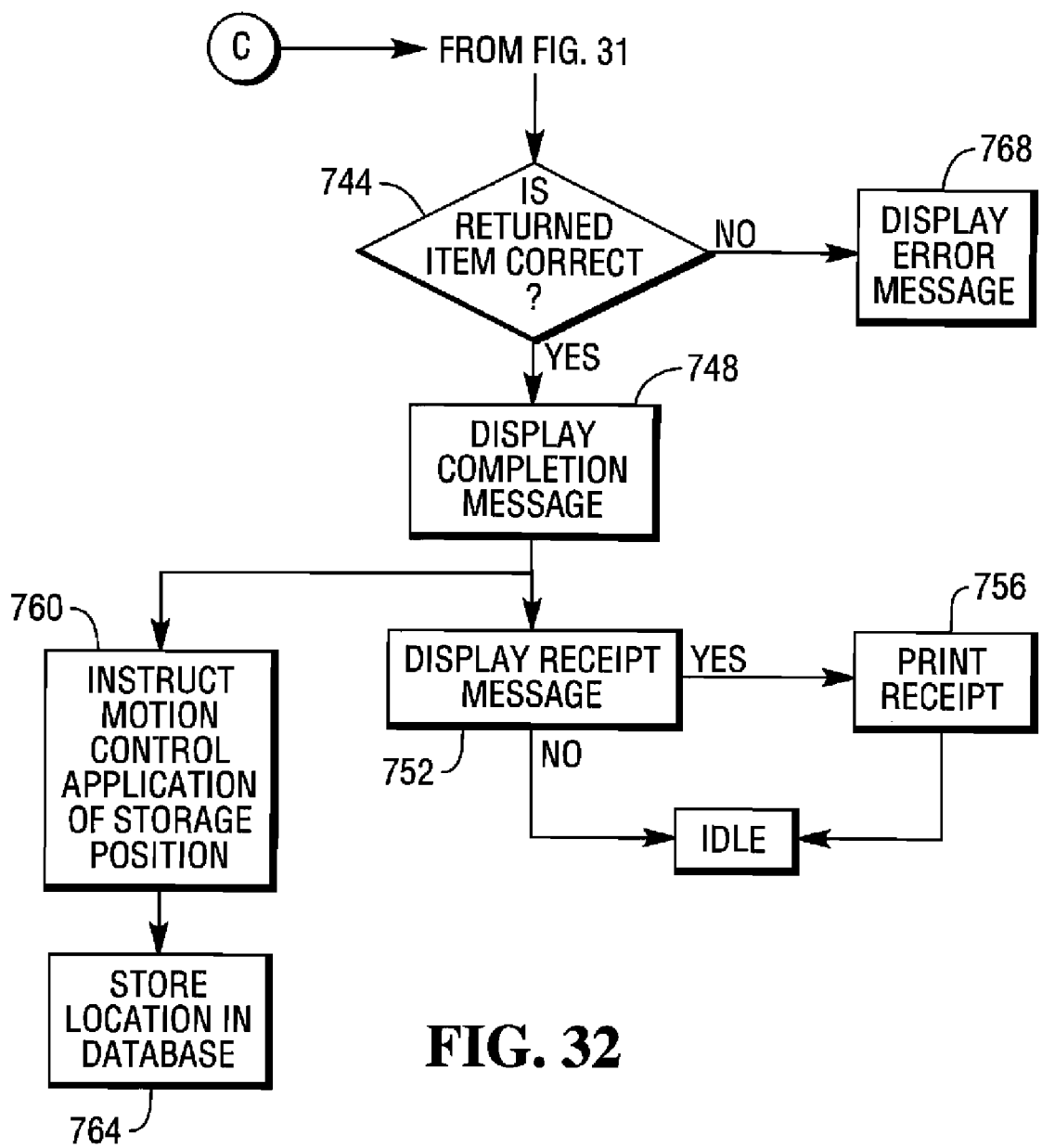
FIG. 32 is a flow chart illustrating operation of the automated business systems of FIGS. 1A and 1B according to one embodiment of the invention.

FIGS. 31-32 illustrate another embodiment of a method of the invention. A user can return an item(s) by positioning it in one of the slots of the port 46. The sensor 304 of the respective slot can sense (at 700) the presence of the item. The sensor 304 can transmit (at 704) a signal to the motion control application 258, which can instruct (at 708) the retrieval system 58 to retrieve the disc-based media from the port 46. The linear positioning table 134 of the retrieval system 58 can move (at 712) along the guide rails 106 in the vertical direction (Y axis) to the location of the port 46 where the returned disc-based media is located. Next, the gripper assembly 158, 158A can move (at 716) along the linear positioning table 134 in the horizontal direction (X-axis) to the location of the port 46 where the returned disc-based media is located. The gripper 162, 162A can move (at 718) along (Z-axis) the guide rails 178, 178A of the extend/retract device 174, 174A to get closer to the disc-based media. The fingers 166, 166A of the gripper 162, 162A can engage (at 720) the disc-based media and the gripper 162, 162A can retract (at 724) along the guide rails 178, 178A and position (at 728) the disc-based media on the table 176, 176A. The RFID reader 254, 254A can read (at 732) the RFID tag 294 on the item to identify the disc-based media. The RFID reader 254, 254A can transmit (at 736) the identification information to the tracking software application 298 to associate the return with a rental transaction. The tracking software application 298 can transmit (at 740) the information to the POS application 86. The POS application 86 can determine (at 744) if the correct disc-based media item is being returned. If the correct disc-based media was inserted in the port 46, the POS application can transmit (at 748) a completion-type of message to the graphical user interface 94 to display on the display 30. The graphical user interface 94 can display (at 752) an option of whether the user would like a receipt. If the user selects 'Yes', the POS application 86 can transmit (at 756) a command to the printer 42 to print a receipt. The POS application 86 can instruct (at 760) the motion control application 258 to position the disc-based media in a particular bin 266 of the storage rack 262. The POS application 86 can store (at 764) the location of the disc-based media in the database 82. The user can be charged for the rental of the item at any time after the selection has been made and/or upon return of the item.

If the incorrect disc-based media is inserted in the port 46, the POS application 86 can transmit (at 768) an error-type of message and a 'Help' option to the graphical user interface 94 to display on the display 30. At this point, the user can retrieve the disc-based media from the port 46 and verify that the correct disc is being returned and can reinsert the disc-based media in the port 46. Acts 700-768 are repeated, as necessary. The user can select the 'Help' option on the display 30 for assistance.

In one embodiment of a method of the invention, the automated business system 10, 500 can handle the return of a plurality of disc-based media items in a single transaction. The user can insert the disc-based media items at relatively the same time in the separate slots of the port 46. The interrogator 302 within each slot of the port 46 can read the RFID tag 294 on each disc-based media item. The automated business system 10, 500 in this embodiment can perform acts 588-652 in the same or similar manner as described above when handling a plurality of returned disc-based media items in the same transaction. Alternatively, the sensor 304 in each slot can detect the presence of the disc-based media and the gripper assembly 158, 158A can retrieve each disc-based media to read the RFID tag 294 on each disc-based media. The automated business system 10, 500 can perform acts 700-768 in the same or similar manner as described above.

In one embodiment of the invention, the automated business system 10, 500 can dispense a plurality of disc-based media items in the same transaction. The user can make a plurality of selections in the same transaction, the retrieval system 58 can retrieve each selection and dispense each selection individually. The automated business system 10, 500 in this embodiment can perform acts 524-584 in the same or similar manner as described above when dispensing a plurality of disc-based media items in the same transaction. Alternatively, the user can make a plurality of selections in the same transaction, the retrieval system 58 can retrieve each selection, and place each selection in one of the slots in the port 46 at a holding position where the user cannot access the selections. When the last selection is positioned in one of the slots, the retrieval system 58 can push all of the selections into the port 46.

Figure 33:
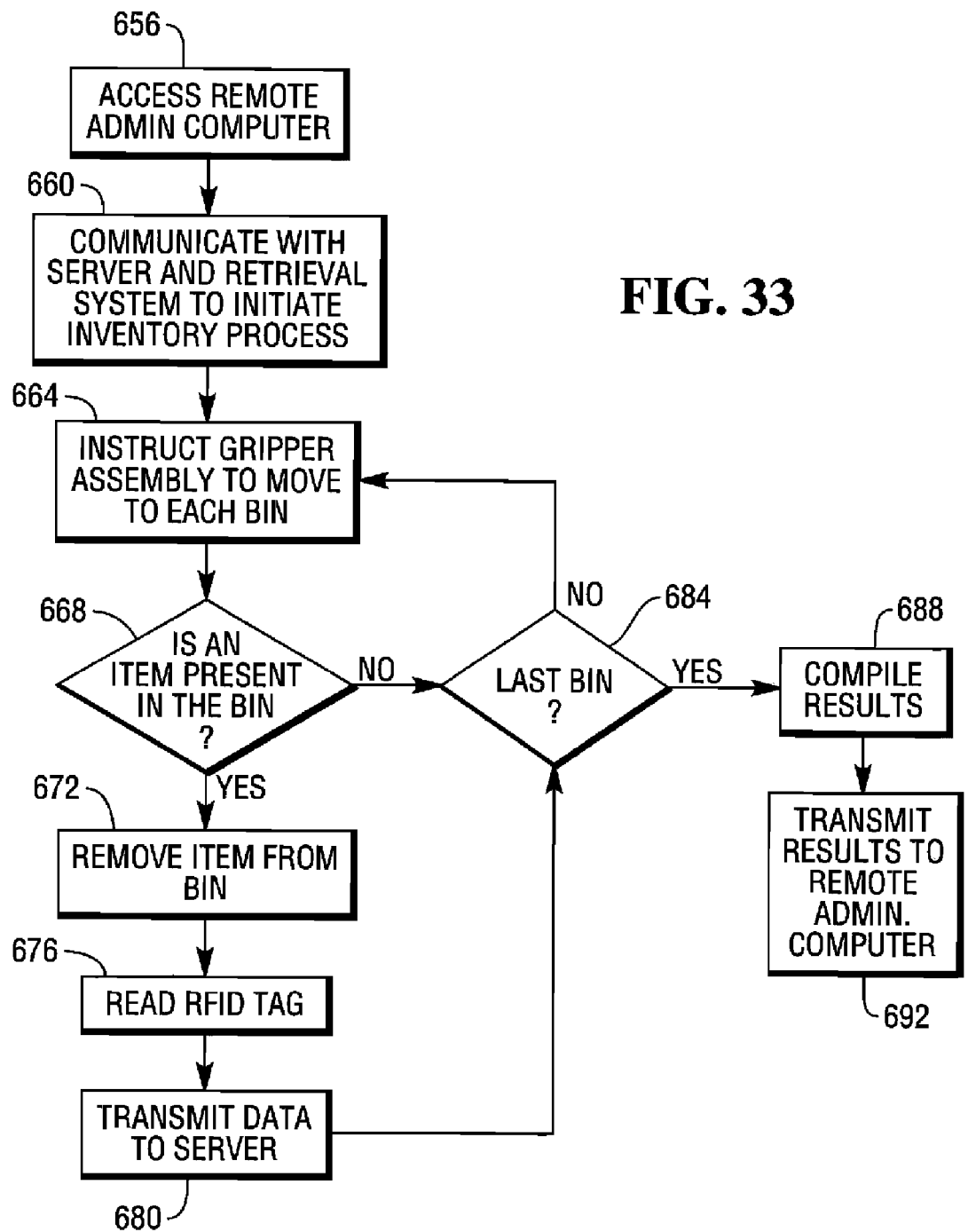
FIG. 33 is a flow chart illustrating operation of the automated business systems of FIGS. 1A and 1B according to one embodiment of the invention.

FIG. 33 is a flow chart illustrating one embodiment of the method of the invention. The automated business system 10, 500 can take a physical inventory of items within the automated business system 10, 500 at any time. A user can access (at 656) the remote administrative terminal 62 and/or can access the automated business system 10, 500 to take an inventory. The remote administrative terminal 62 can communicate (at 660) with the server 54, which can communicate with the retrieval system 58 and the identification and tracking system 290 to initiate the inventory process. The retrieval system 58 can instruct (664) the gripper assembly 158, 158A to move to each bin 266 in the storage rack 262. While at each bin 266, the gripper assembly 158, 158A can determine (at 668) if an item is present. If an item is present in the bin 266, the gripper assembly 158, 158A can remove (at 672) the item from the bin 266. While the item is removed from the bin, the RFID system 246, 246A can read (at 676) the RFID tag 294 on the item. The read information can be transmitted (at 680) to the identification and tracking system 290 to store the read information. The retrieval system 58 can determine (at 684) whether the gripper assembly 158, 158A is at the last bin 266. If the gripper assembly 158, 158A is not at the last bin 266, the retrieval system 58 repeats act 664 and instructs the gripper assembly 158, 158A to move to the next bin 266. If the gripper assembly 158, 158A is at the last bin 266, the retrieval system 158, 158A can instruct the identification and tracking system 290 to compile (at 688) the results of the inventory process and can transmit (at 692) the results to the remote administrative computer terminal 62 as well as the database 82. If an item is not present in the bin 266 at act 668, the retrieval system 58 can determine (at 684) whether the gripper assembly 158, 158A is at the last bin 266. If the gripper assembly 158, 158A is not at the last bin 266, the retrieval system 58 repeats act 664 and instructs the gripper assembly 158, 158A to move to the next bin 266. If the gripper assembly 158, 158A is at the last bin 266, the retrieval system 58 can instruct the identification and tracking system 290 to compile (at 688) the results of the inventory process and can transmit (at 692) the results to the remote administrative computer terminal 62.

Figure 34:
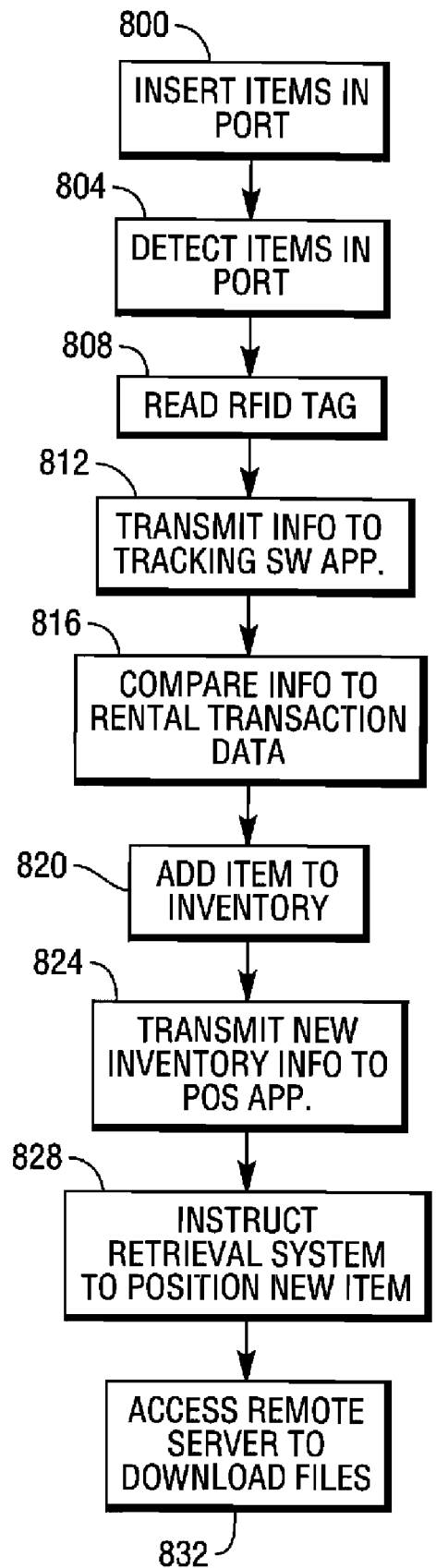
FIG. 34 is a flow chart illustrating operation of the automated business systems of FIGS. 1A and 1B according to one embodiment of the invention.

FIG. 34 is a flow chart illustrating one embodiment of the method of the invention. The owner of the automated business system 10, 500 can add inventory items without having to open the automated business system 10, 500. The automated business system 10, 500 includes a door 306 operable to open and provide access to the interior of the housing 18. Items can be added to inventory by manually positioning the items in a bin 266 and initiating an inventory process as described above. Alternatively, the owner of the automated business system 10, 500 can insert (at 800) items in the port 46 that are to be added to the inventory. One or more items can be inserted in the port 46 at the same time. The identification and tracking system 290 can automatically detect (at 804) the items in the port 46. The interrogator 302 can read (at 808) the RFID tag 294 on each item. The interrogator 302 can transmit (at 812) the identification information to the tracking software application 298. The tracking software application 298 can compare (at 816) the identification information to rental transactions stored in the database 82. Because the identification information is new to the automated business system 10, 500, the identification information would not be associated with a rental transaction. The tracking software application 298 can add (at 820) the item to inventory. The tracking software application 298 can transmit (at 824) the new inventory information to the POS application 86. The POS application can instruct (at 828) the retrieval system 58 to retrieve the item from the port 46 and position the new item in a bin 266. When new items are added to inventory, the server 54 can access (at 832) the remote server 74 to update inventory records and download video and sound files associated with the new item.

Figure 35:
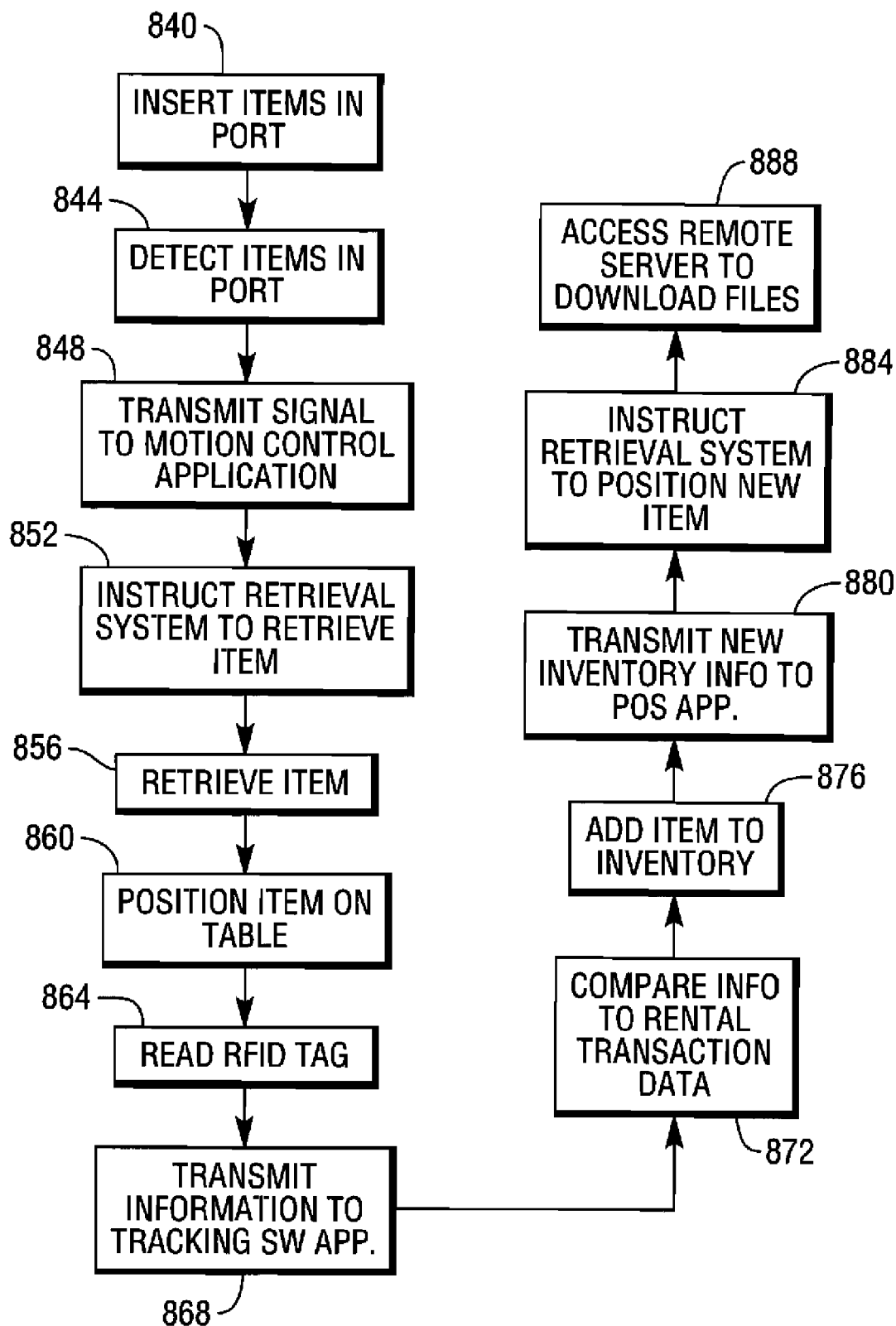
FIG. 35 is a flow chart illustrating operation of the automated business systems of FIGS. 1A and 1B according to one embodiment of the invention.

FIG. 35 is a flow chart illustrating one embodiment of the method of the invention. The owner of the automated business system 10, 500 can add inventory items without having to open the automated business system 10, 500. The automated business system 10, 500 includes a door 306 operable to open and provide access to the interior of the housing 18. Items can be added to inventory by manually positioning the items in a bin 266 and initiating an inventory process as described above. Alternatively, the owner of the automated business system 10, 500 can insert (at 840) items in the port 46 that are to be added to the inventory. One or more items can be inserted in the port 46 at the same time. The sensor 304 can automatically detect (at 844) the items in the port 46. The sensor 304 can transmit (at 848) a signal to the motion control application 258, which can instruct (at 852) the retrieval system 58 to retrieve the disc-based media from the port 46. The gripper assembly 158, 158A can retrieve (at 856) the disc-based media and position (at 860) the disc-based media on the table 176, 176A. The RFID reader 254, 254A can read (at 864) the RFID tag 294 on each item. The RFID reader can transmit (at 868) the identification information to the tracking software application 298. The tracking software application 298 can compare (at 872) the identification information to rental transactions stored in the database 82. Because the identification information is new to the automated business system 10, 500, the identification information would not be associated with a rental transaction. The tracking software application 298 can add (at 876) the item to inventory. The tracking software application 298 can transmit (at 880) the new inventory information to the POS application 86. The POS application 86 can instruct (at 884) the retrieval system 58 to position the new item in a bin 266. When new items are added to inventory, the server 54 can access (at 888) the remote server 74 to update inventory records and download video and sound files associated with the new item. Alternatively, new inventory information can be downloaded to the database 80 in anticipation of new inventory to be added. Once the new inventory is added the POS application 86 then makes this inventory available for any subsequent transaction.

In one embodiment of the invention, the automated business system 10 can store items other than disc-based media 286 that are desirable to be rented or purchased. In one embodiment of the invention, the automated business system 10 can dispense health and beauty aids (e.g., over-the-counter medications, cosmetics, toiletries, etc.). The automated business system 10 can be modified accordingly. For example, the storage racks 262 can be modified to accommodate the various sizes of health and beauty products. Users of the automated business system 10 can answer various questions to receive a recommendation for a product(s). In the retail environment, users generally have to read labels to determine which product(s) to purchase. Rather than having to read all of the product labels, the POS application 86 can generate questions and based on the answers, the POS application can recommend a product(s) to the user. The POS application 86 can be modified to generate various questions related to the users' need for certain products and the graphical user interface 94 can be modified to display the various questions. For example, the POS application 86 can generate questions that relate to symptoms, age, most likely time that the product will be used, etc. and, the POS application 86 can recommend a certain product that satisfies all or most of the answers provided by the user. Each product can include a RFD tag 294, and the automated business system 10 can operate in the same or similar manner as described above.

Figure 36:
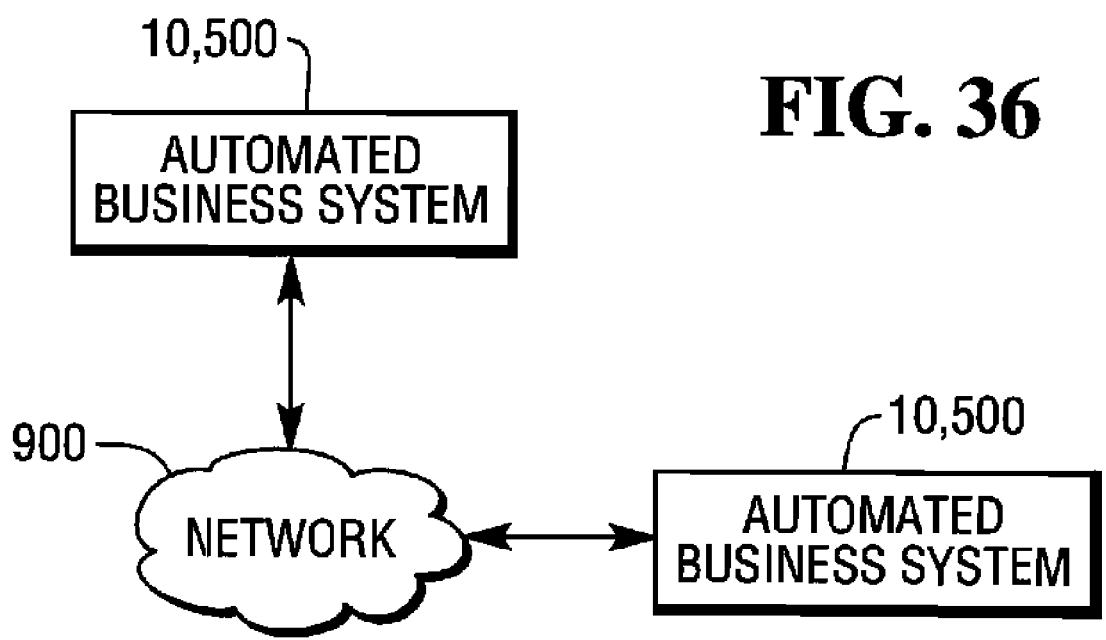
FIG. 36 is a schematic of the automated business systems of FIGS. 1A, 1B, and 27 according to one embodiment of the invention.

FIG. 36 illustrates multiple automated business systems 10, 500 coupled via a network 900 according to an embodiment of the invention. The network 900 can be built according to any networking technology or topology or combinations of technologies and topologies and may include multiple sub-networks. Connections between the server 54 and the network 66 can be made through local area networks ("LANs"), wide area networks ("WANs"), public switched telephone networks ("PSTNs"), Intranets, the Internet, and/or any other suitable networks. The two-way arrows in FIG. 36 represent two-way communication and information transfer between the network 66 and the automated business systems 10, 500.

Various features and advantages of the invention are set forth in the following claims.

What is claimed is:

1. A method of servicing a disc-based media system, the method comprising:
  accessing the disc-based media system with a remote computer terminal;
  communicating with a motion controller in a retrieval system within the disc-based media system utilizing the remote computer terminal;
  utilizing the remote computer terminal to remotely perform diagnostic and servicing functions for the retrieval system utilizing data from the motion controller; and
  correcting the retrieval system related problems associated with the disc-based media system utilizing the remote computer terminal.

2. The method of claim 1 further comprising:
adjusting speed, sensitivity and timing of the retrieval system utilizing the remote computer terminal.

3. The method of claim 1 wherein the motion controller comprises a multi-axis motion controller, and the method further comprises:
displaying a display screen illustrating speed on a vertical, horizontal, and insertion axes, sensitivity and timing of the retrieval system.

4. The method of claim 1 further comprising:
communicating with a server in the disc-based media system; and
diagnosing performance of a user peripheral in the disc-based media system.

5. The method of claim 4 wherein said step of diagnosing performance of a user peripheral comprises monitoring status of paper in a receipt printer.

6. The method of claim 4 wherein the disc-based media system comprises plural user stations contained in a common housing, each user station employing a processor to control user interface devices and wherein each processor communicates with the server, wherein said step of diagnosing performance of a user peripheral comprises diagnosing performance of user interface devices from all of the plural user stations.

7. The method of claim 1 further comprising:
communicating with the motion controller to control the motion controller to conduct a physical inventory of disc-based media in the disc-based media system.

8. A disc-based media management system comprising:
a user station for selecting disc-based media, the user station employing a retrieval system to retrieve selected disc-based media; and
a remote computer terminal;
the remote computer terminal communicating with a motion controller in the retrieval system within the user station;
the remote computer terminal diagnosing performance of the retrieval system utilizing data from the motion controller, and communicating with the motion controller to correct retrieval system related problems associated with the disc-based media system.

9. The system of claim 8 wherein the remote terminal controls the motion controller to adjust speed, sensitivity, and timing of the retrieval system.

10. The system of claim 8 wherein a display screen of the remote computer terminal displays speed, sensitivity, and timing of the retrieval system.

11. The system of claim 8 further comprising a server in the user station, and wherein the remote computer terminal communicates with the server and diagnoses performance of a user peripheral in the user station.

12. The system of claim 11 wherein the user peripheral comprises a receipt printer and the remote computer terminal monitors status of paper in the receipt printer.

13. The system of claim 11 wherein the disc-based media management system further comprises plural user stations each employing a processor to control user interface devices and each processor communicating with the server, wherein peripherals from all of the plural user stations have their performance diagnosed by the remote computer terminal.

14. The system of claim 8 wherein the remote terminal computer communicates with the motion controller to control the motion controller to conduct a physical inventory of disc-based media in the user station.

15. A method of servicing a disc-based media system, the method comprising:
accessing the disc-based media system with a remote computer terminal;
communicating with a server within the disc-based media system, the server communicating with a processor controlling user peripherals, as well as, a motion controller which controls a retrieval system for retrieving disc-based media;
diagnosing performance of the user peripherals and the retrieval system utilizing data from the server including data from the motion controller; and
correcting retrieval system related problems associated with the disc-based media system utilizing the remote computer terminal.

16. The method of claim 15 further comprising:
adjusting speed, sensitivity and timing of the retrieval system.

17. The method of claim 15 further comprising:
displaying a display screen illustrating speed, sensitivity and timing of the retrieval system.

18. The method of claim 15 wherein said step of diagnosing performance of the user peripherals comprises monitoring status of paper in a receipt printer.

19. The method of claim 15 wherein the disc-based media system comprises plural user stations each employing a processor to control user interface devices with each processor communicating with the server, wherein said step of diagnosing performance of the user peripherals comprises diagnosing performance of user interface devices from all of the plural user stations.

20. The method of claim 15 further comprising:
communicating with the motion controller to control the motion controller to conduct a physical inventory of disc-based media in the disc-based media system.

* * * * *